United States Patent

[11] 3,600,655

[72] Inventors: Richard A. Karlin, Wilmette, Ill.; Edgar J. Justus, Beloit, Wis.; Leroy H. Busker, Rockton, Ill.
[21] Appl. No.: 730,825
[22] Filed: May 21, 1968
[45] Patented: Aug. 17, 1971
[73] Assignee: Beloit Corporation, Beloit, Wis.

[54] SYSTEM FOR CONTROLLING THE SPEED OF A PLURALITY OF MOTORS WHICH HAVE OUTPUT SHAFTS TO DRIVE ELEMENTS THAT ARE INTERRELATED
26 Claims, 19 Drawing Figs.

[52] U.S. Cl. ............... 318/67, 318/78, 318/85, 318/227, 318/230, 321/45
[51] Int. Cl. ............... H02p 5/52
[50] Field of Search ............... 318/78, 68, 66, 67, 329, 341, 376, 77, 85, 171, 227, 230; 321/4, 27, 5, 45 ER

[56] References Cited

UNITED STATES PATENTS

| | | | |
|---|---|---|---|
| 2,077,768 | 4/1937 | Perry | 318/78 X |
| 3,064,173 | 11/1962 | Breen | 318/77 X |
| 3,176,207 | 3/1965 | Wallace | 318/67 |
| 3,206,664 | 9/1965 | Lilly | 318/67 |
| 3,262,036 | 7/1966 | Clarke et al. | 318/230 |
| 3,343,063 | 9/1967 | Keeney, Jr. et al. | 318/171 X |
| 3,416,057 | 12/1968 | Froyd et al. | 318/171 X |
| 3,271,649 | 9/1966 | Juergensen | 318/376 |
| 3,273,041 | 9/1966 | Strohmeier | 321/4 |
| 3,307,094 | 2/1967 | Ogle | 318/227 UX |
| 3,430,123 | 2/1967 | Corry | 321/4 |
| 3,439,242 | 4/1969 | Gasser | 321/27 UX |
| 3,250,978 | 5/1966 | Moscardi | 318/345 |
| 3,447,050 | 5/1969 | Geis | 318/78 |

OTHER REFERENCES

Ryder, John P. Engineering Electronics Second Ed., 1957, McGraw-Hill Gr. 211, pp. 360— 361, 397— 400.

Primary Examiner—T. E. Lynch
Attorney—Hill, Sherman, Meroni, Gross & Simpson

ABSTRACT: A motor control system for a papermaking machine formed of a rectifier and inverter circuit connected between an alternating current source of fixed frequency and a plurality of synchronous motors of the papermaking machine which are to be driven with a frequency which can be varied. A single master oscillator provides a common source for a plurality of divider circuits, each of which are connected to the respective inverter circuit associated with each individual motor. Each divider circuit is formed of a "runup" speed control circuit which enables gradual increase of motor speed, a speed control logic circuit which provides a "draw" control between individual motors, and a polyphase generator to provide a polyphase voltage which is applied to the individual motors. Each speed control logic circuit is variable to control the speed of individual motors, and, consequently, the "draw" between the motors. The master oscillator is variable to control the speed of all motors jointly and concurrently.

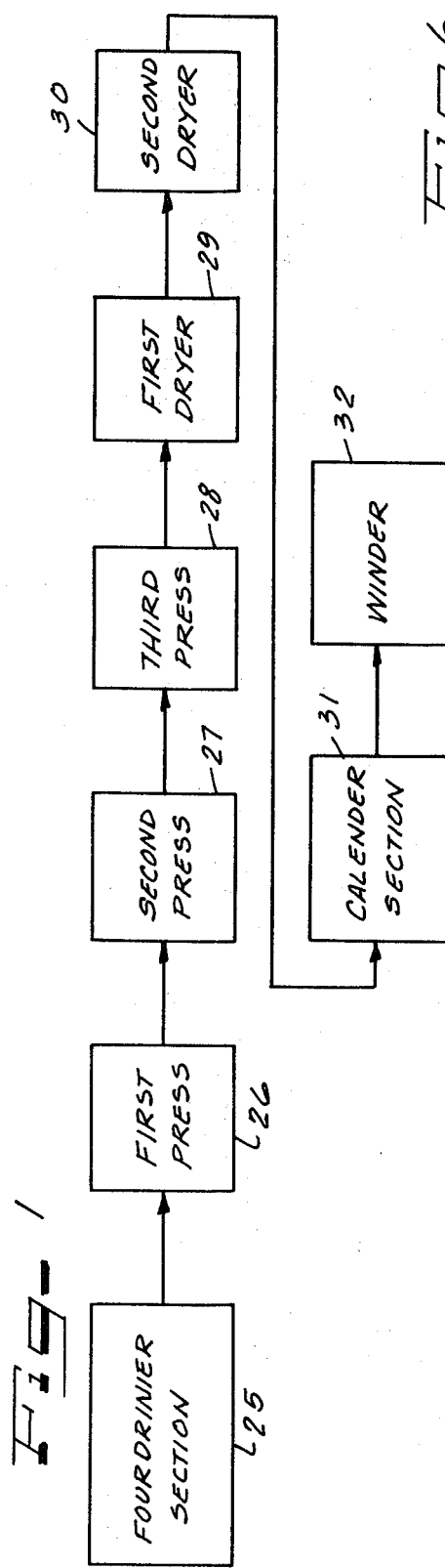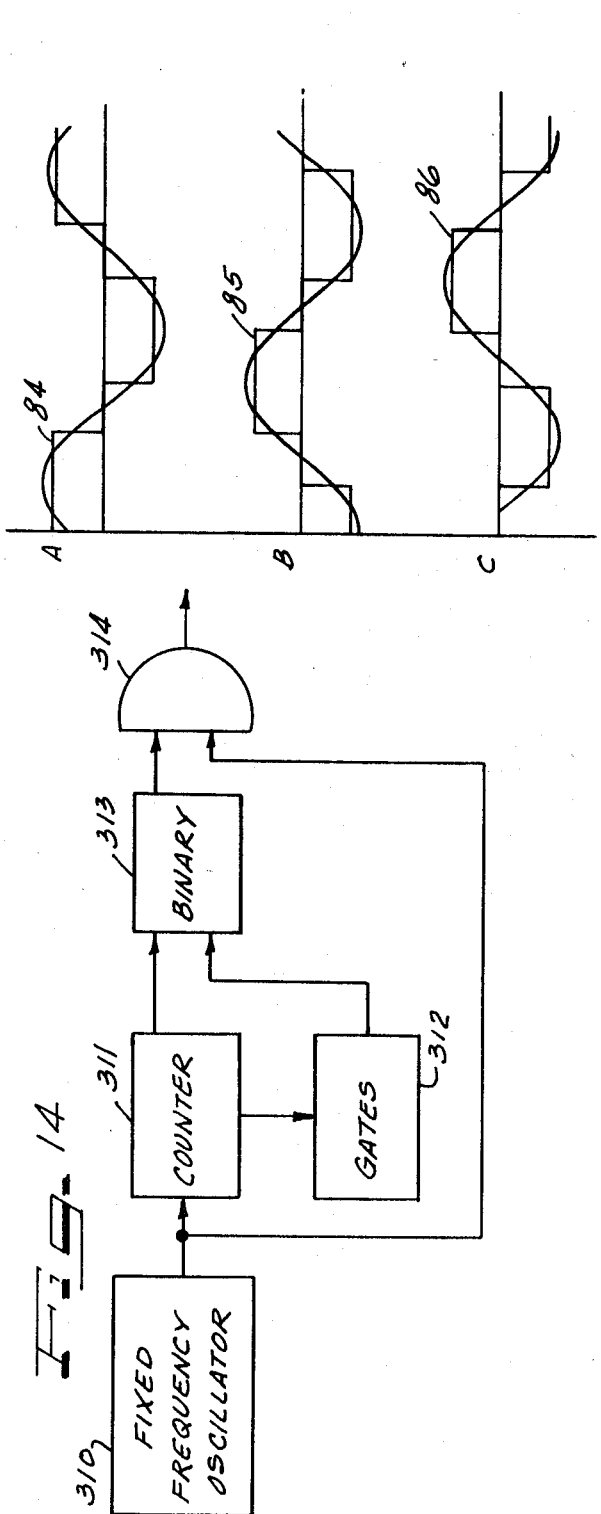

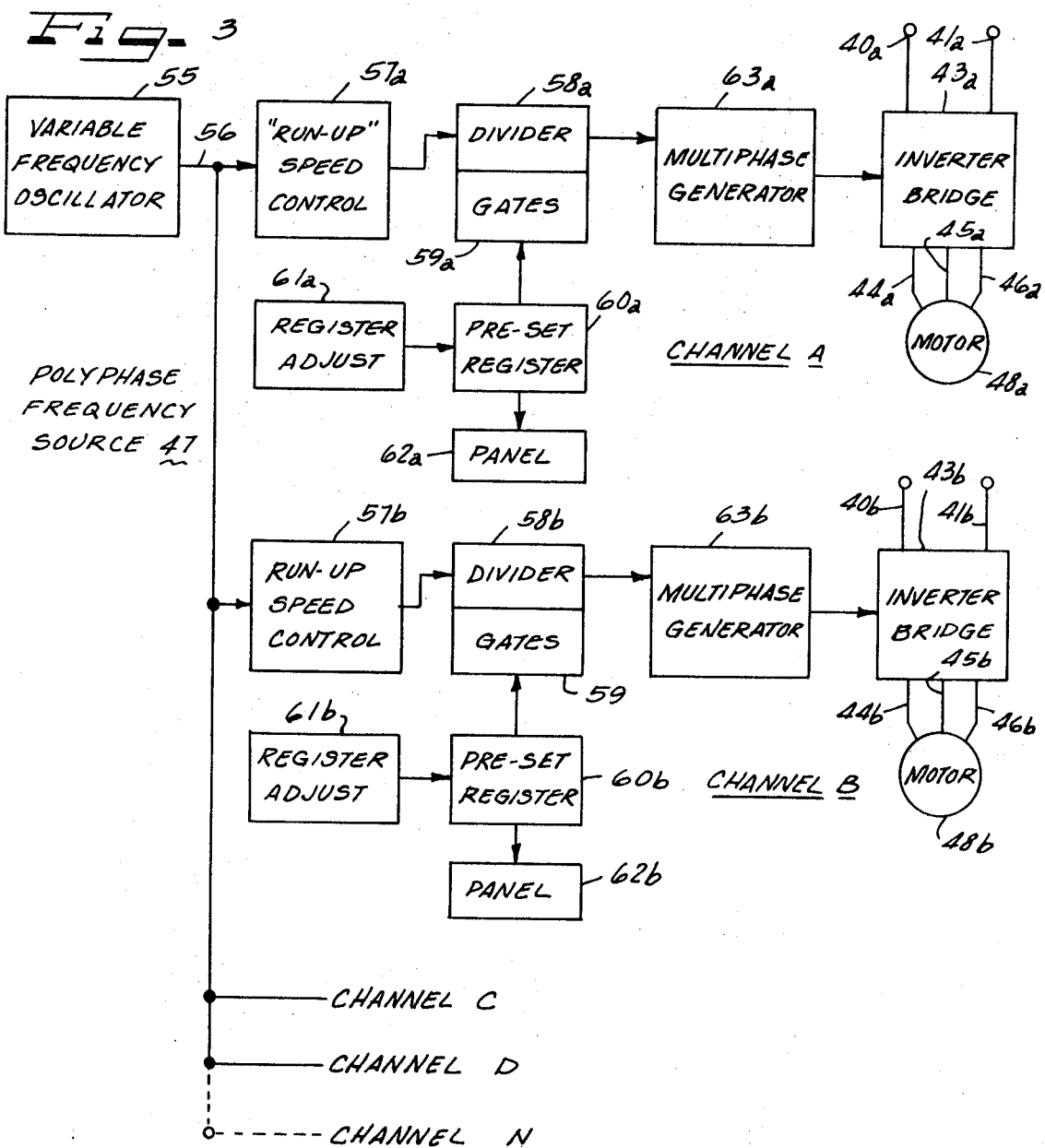

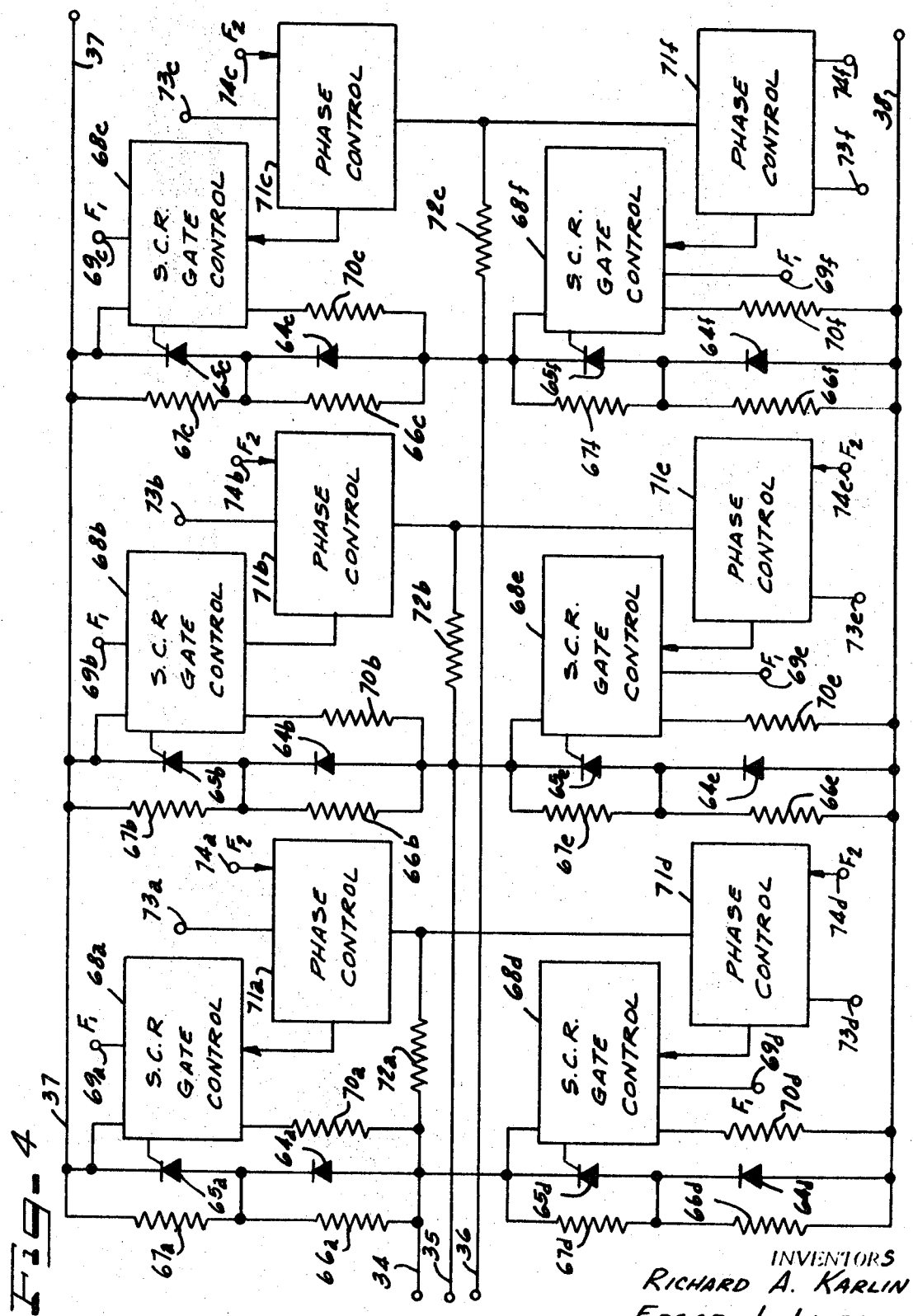

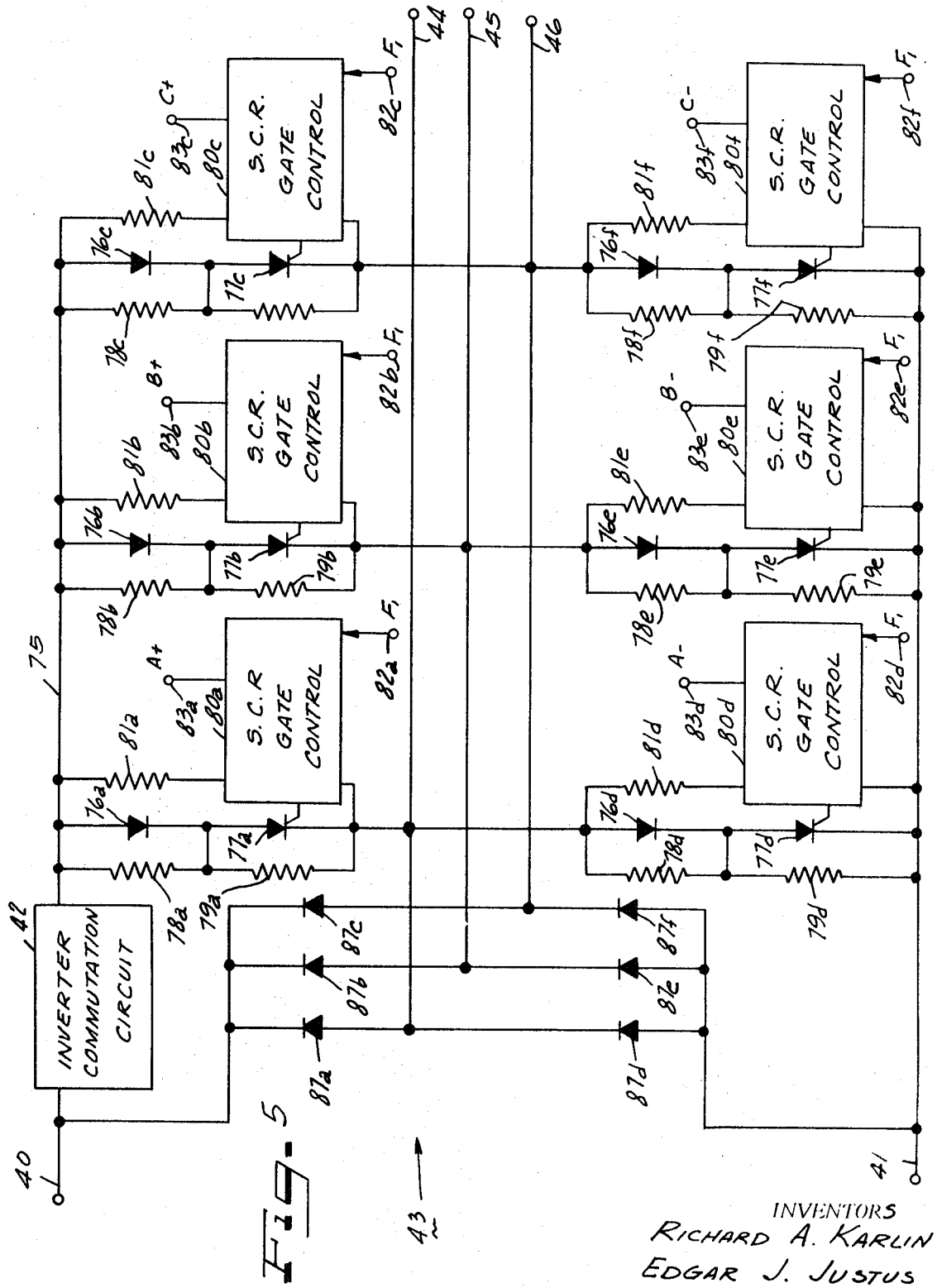

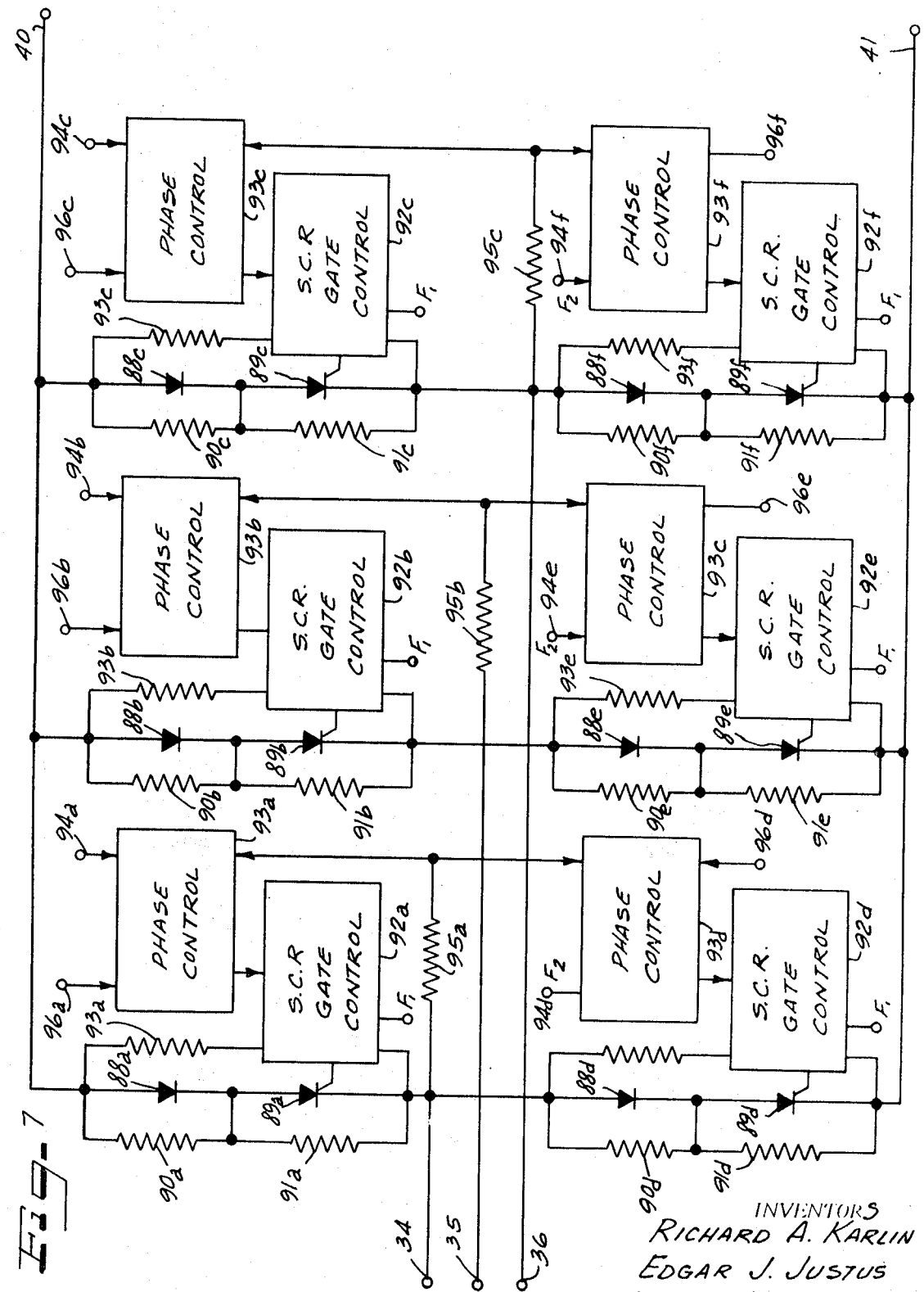

INVENTORS
RICHARD A. KARLIN
EDGAR J. JUSTUS
LEROY H. BUSKER
ATTORNEYS

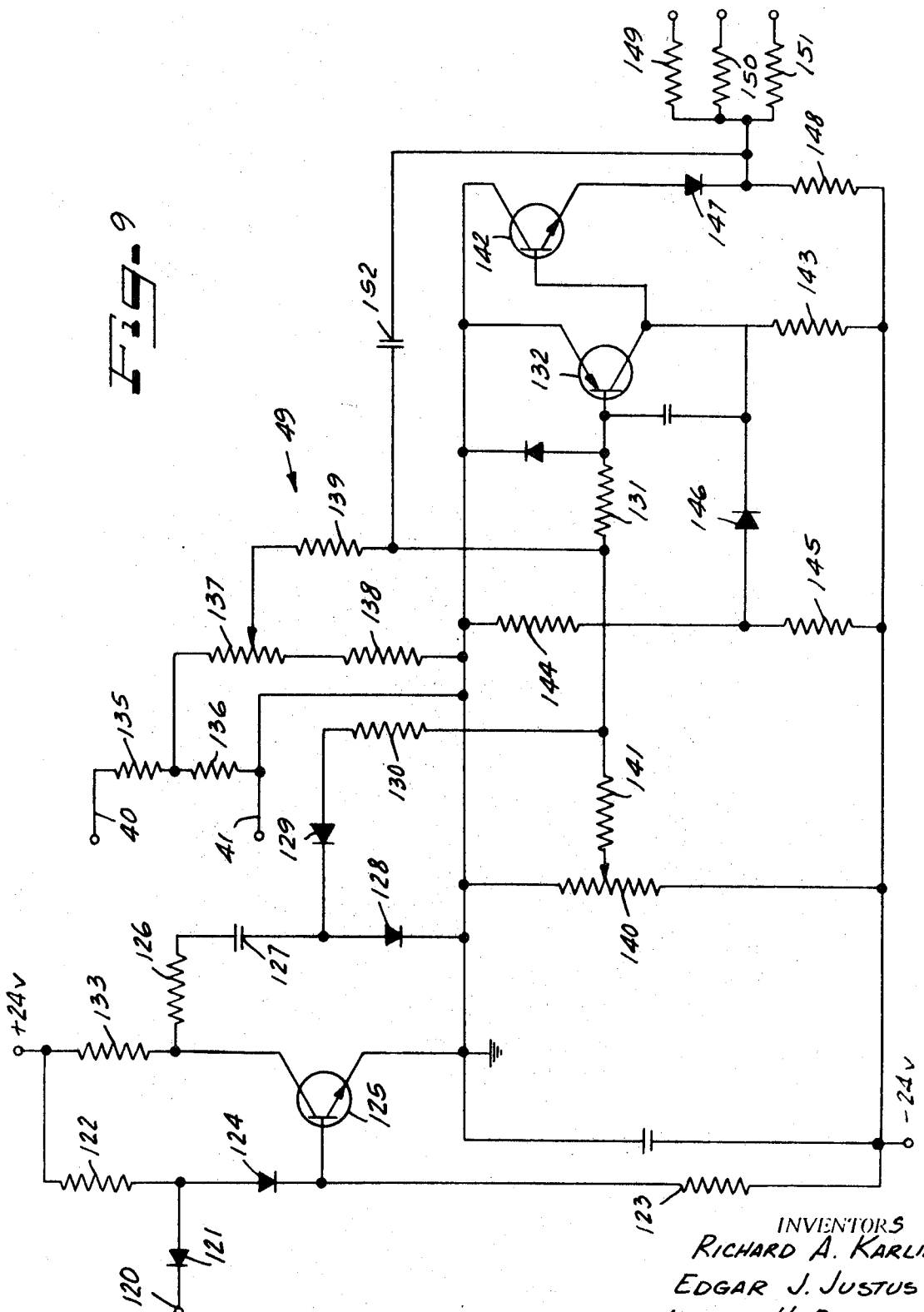

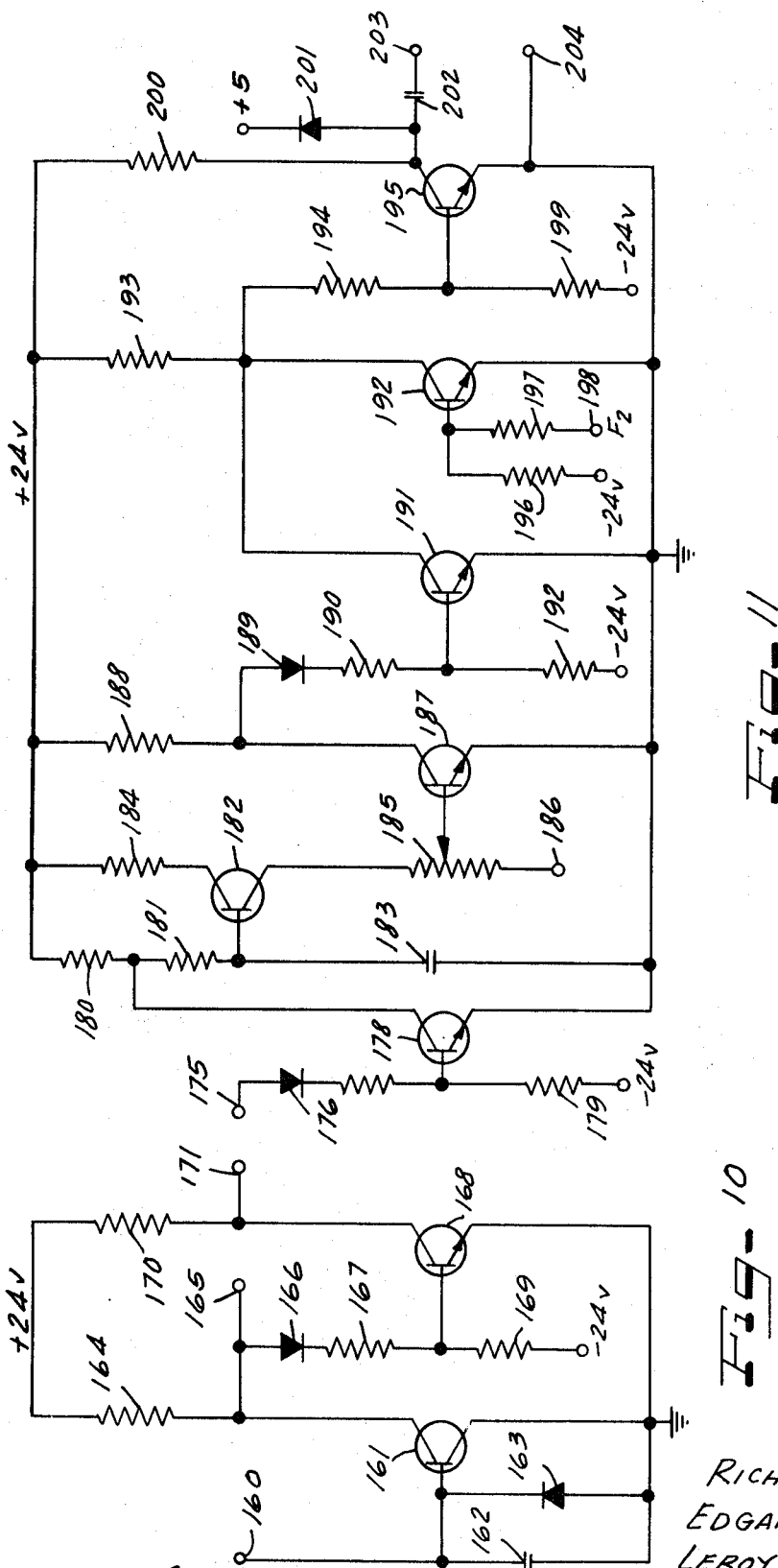

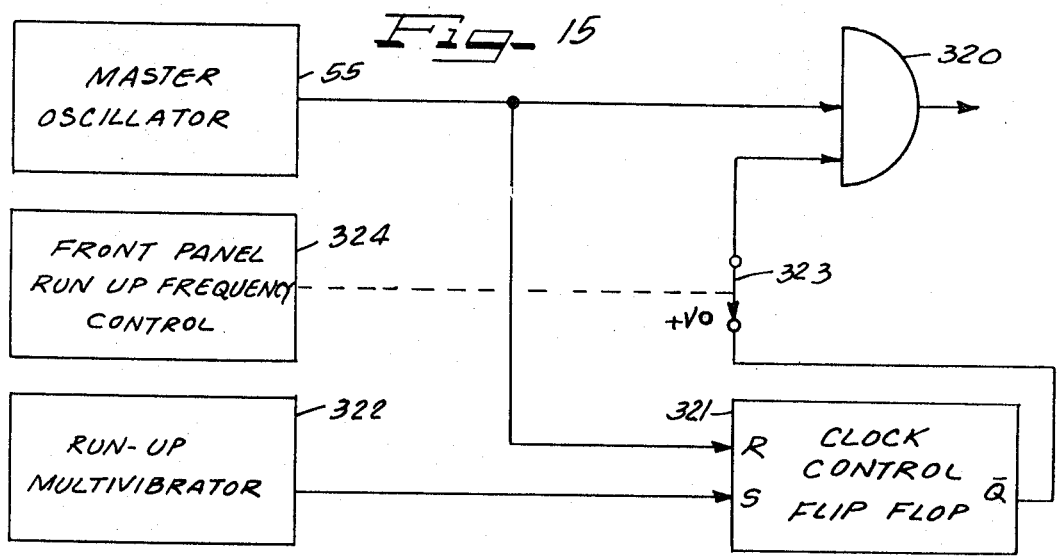
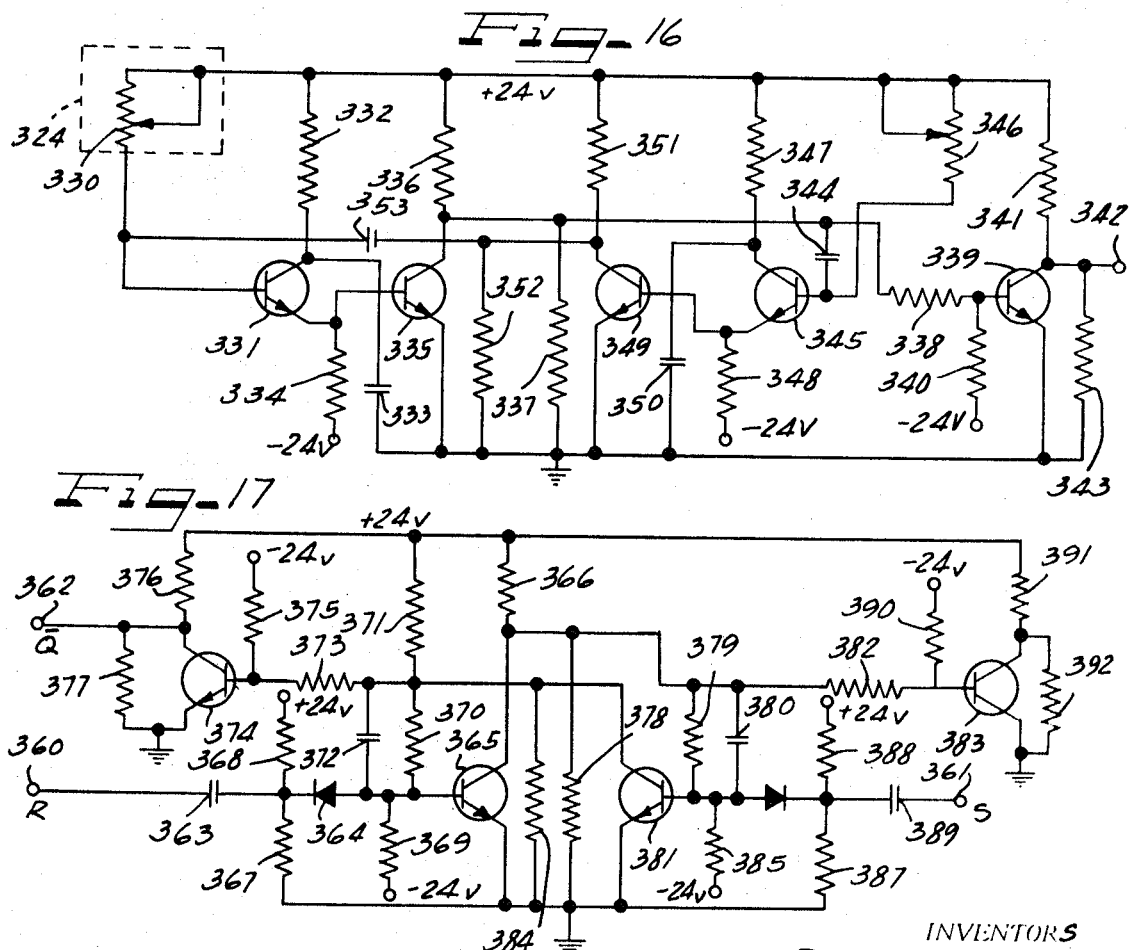

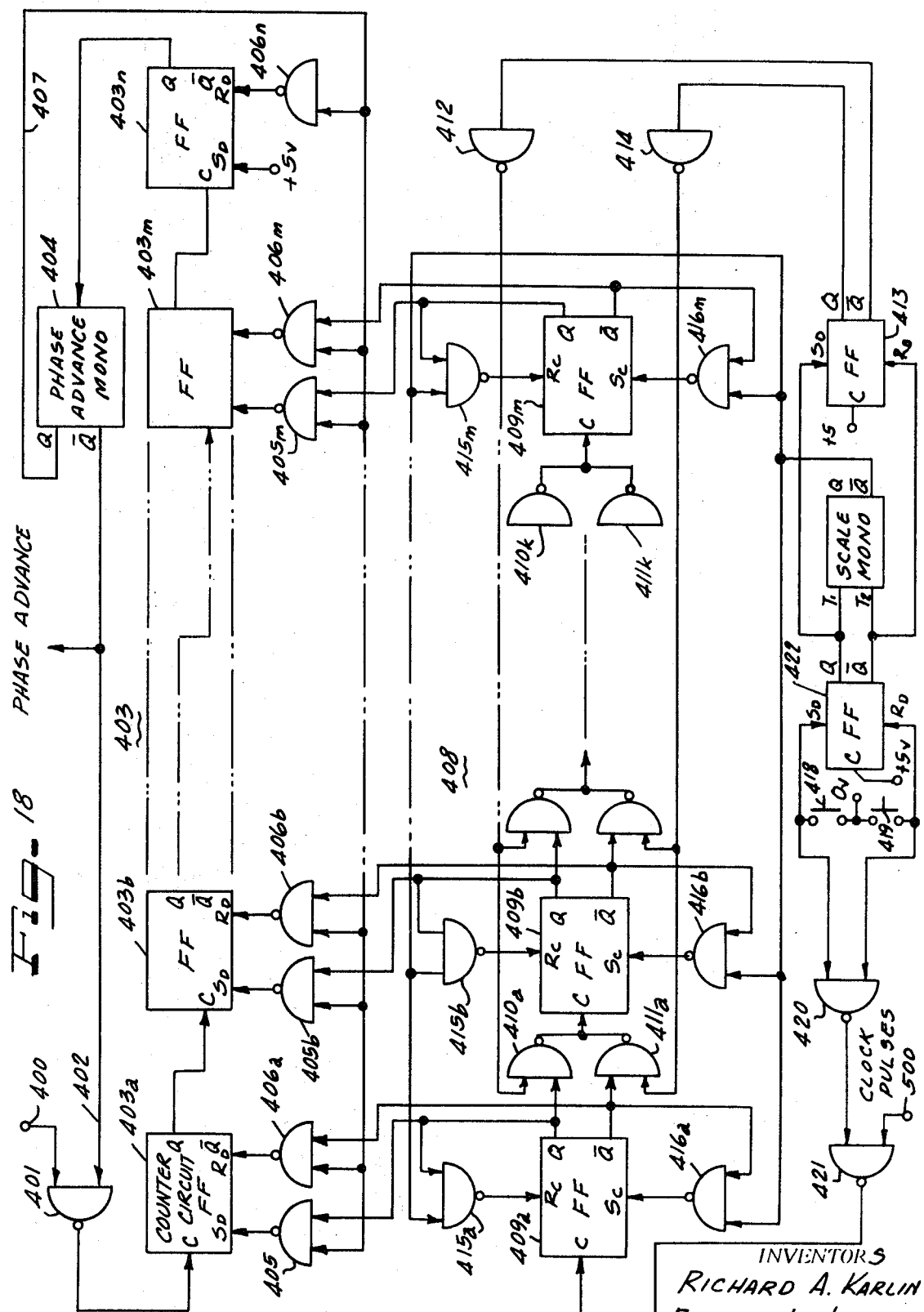

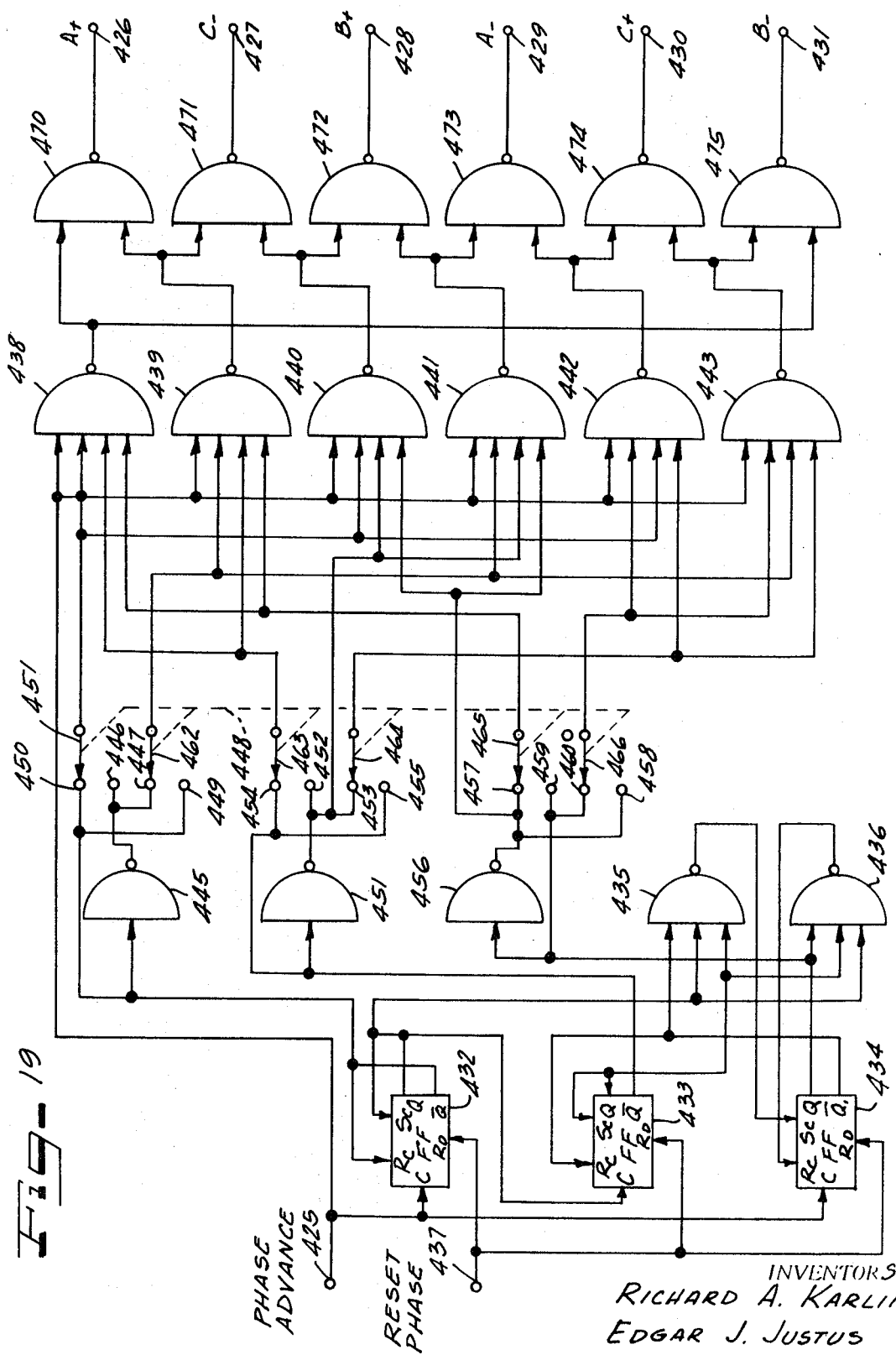

SYSTEM FOR CONTROLLING THE SPEED OF A PLURALITY OF MOTORS WHICH HAVE OUTPUT SHAFTS TO DRIVE ELEMENTS THAT ARE INTERRELATED

BACKGROUND OF THE INVENTION

1. Field of the Invention

This invention relates generally to a motor-speed control system and more particularly to a system for controlling the speed of a plurality of motors, each disposed for driving a separate station of a machine, whereby the speeds of the motors are individually variable to change the speed ratio therebetween and also jointly variable while maintaining a fixed ratio between each. In particular, the present invention is directed to a motor-control system for a paper making machine wherein the speed of the entire machine can be varied while maintaining a fixed speed relation or ratio between each section thereof and wherein the speeds of individual sections can be varied with respect to one another.

2. Description of the Prior Art

Processing machines which are generally formed of a plurality of separate stations each interconnected with one another to produce a unitary result, such as a paper making machine, are generally operated by applying rotary power to a number of shafts. Each of the shafts must be driven so that their angular velocities are jointly proper for the desired process rate and severally in ratio to each other such that proper speed ratios are maintained between individual stations throughout the entire length of the machine. In a paper machine, for instance, it is necessary to maintain a predetermined speed ratio between stations in order to maintain a desired tension in the paper web between those stations.

Each shaft may be driven from a separate source of power, or two or more shafts, up to a total of all of the shafts, may be driven from a common source of power. In the case of each shaft being driven from a separate source of power, the angular velocities of the shafts may be varied as to both absolute rate and ratios by changing either the rate of the power source or the ratio of the coupling from the power source to the shaft. In the case of several shafts sharing the same power source, the adjustment of the ratio must of necessity be accomplished by a variable coupling.

Careful control of both the joint rate and ratios is essential for proper and economical operation. Since some rate variation is likely to occur in most variable rate power sources and in most variable rate couplings, it is necessary to employ some method of measuring the angular velocity of every shaft, of comparing the measured angular velocity with the desired angular velocity, and of correcting errors in the angular velocity due to the variation.

It is customary to employ tachometers to measure the angular velocity of a motor and servo amplifiers to compare the actual velocity with the desired angular velocity and provide the power to operate a device to cause the necessary correction. These feedback systems have several disadvantages including the occurrence of "hunting," the possibility of error in the desired setting or in the tachometer, the difficulty of maintaining the system, and the difficulty of achieving accuracies of better than 1 percent in practice. Many of these limitations stem from the use of inprecise analogs to represent the measured angular velocity and the desired set point.

If each of the shafts of the machine were driven through a coupling from a power source, with the power source rate and the coupling ratio being fixed, a considerable advantage would be realized, since feedback and comparison controls would not be necessary. In such a system, the power sources and couplings could be set to the desired absolute rate and ratio, respectively, and would remain at these desired set rates.

However, in a great many processing machines, particularly those employed in the making of a paper product, a fixed rate power source and fixed ratio coupling to each of the shafts is not practical. A particular paper making machine, for instance, must have an overall variation in the speed of the entire machine of 1:10. Furthermore, a variation between individual stations of the machine must be variable by a factor of at least 10 percent with respect to one another. Therefore, for a papermaking machine, the rate of the power source must be variable by a factor of 10 and ratio of the couplings must be variable within a range of at least 10 percent with respect to one another.

It has been proposed to provide such a system with a power source having a fixed rate connected through a plurality of couplings to the individual motors, with the couplings being adjustable for varying the speed of the entire machine as well as varying the ratio between individual stations of the machine. Since a change in the speed of all the motors concurrently requires individual adjustment of each coupling, such a system is practical only in vary limited applications, such as when the overall speed of the entire machine is varied by a relatively small factor. Furthermore, the adjustments must necessarily be of a small increment if made during the production process. As the requirements for speed variation of the entire machine increase, such a system becomes impractical primarily due to the complexity and resultant cost of the couplings. Furthermore, the accuracy of such a system is comparatively low due to the relatively wide range of variation required of each of the couplings.

It is known that a synchronous electric motor will operate at a rate dependent on, and in constant ratio to, the input frequency supplied thereto. Furthermore, such a motor can be coupled to a shaft through a constant ratio coupling by the employment of suitable gear entrainment. If the numerous shafts of a machine were coupled to several such synchronous electric motors through such constant ratio couplings, then by the application of proper frequencies of electric currents to the motors, the angular velocities of the shafts and the ratios of the angular velocities can be maintained at the desired rate to the same accuracy as that of the frequencies of the applied electric currents.

One of the methods of generating the required electrical currents is by means of a fixed frequency master oscillator followed by a plurality of frequency dividers each connected to a respective motor. Such a system is substantially identical to that employing variable couplings. As previously mentioned, such a system is practical only for relatively small variations in the entire machine speed. However, in a system wherein the master oscillator is followed by a plurality of dividers each connected to a respective motor and wherein the master oscillator output frequency is adjustable for altering the speed of the entire machine, difficulties may arise if the speed range of the machine is relatively great. One of the major difficulties encountered in such an arrangement is that the known adjustable oscillators are not accurate over any appreciable range of required adjustment. For example, an LC oscillator requires adjustment of either the capacitance or the inductance by a factor of at least 16 to obtain a frequency change of a factor of 4. Other adjustable oscillators also provide difficulty. However, such a system is an advance over the previously described system wherein the individual ratio couplers or dividers are adjustable and provide solely the required speed change for the entire machine.

The concept of providing a master oscillator which is variable in frequency to drive a plurality of motors each through a respective frequency divider has particular merit in those processing machines which have a wide speed range requirement. In papermaking machines, for instance, it is necessary that the machine can be operated from a complete standstill to operating speeds which are relatively great. In addition, a certain amount of draw is required between certain sections of a paper machine. This draw is effected by providing a different speed at one station of the paper making machine than that at another station thereof. However, in order to maintain this draw constant while the speed of the entire machine is changed, difficulties are encountered in those systems wherein the master oscillator is maintained at a fixed output frequency and adjustment is provided by the individual frequency dividers connected to each of the motors. Therefore, a need exists for a system wherein the master oscillator is adjustable over a relatively wide frequency range and is connected to a plurality of dividers each of which are also adjustable over a predetermined range and are connected to a respective motor of the processing machine.

In order to provide a master oscillator which overcomes the disadvantages mentioned hereinabove, it has been contemplated to form such a master oscillator section of fixed frequency followed by a master divider, which is in turn followed by a plurality of dividers each connected to a respective motor of the processing machine. Although such a system fulfills the need with respect to maintaining a proper draw between individual stations or sections of a paper machine, it is not as feasible as it may appear at first blush. In order to provide the required resolution at both the individual dividers and at the master divider, the fixed frequency oscillator must be of a relatively large frequency in order to provide an output frequency within the range of known synchronous motors. For instance, if the master divider has a resolution of 1:1,000 and the individual dividers have a resolution of 1:10,000, in order to provide an output frequency in the range of 360 hertz, the fixed frequency oscillator must provide an output of 3.6 gigahertz. Therefore, although such a system would overcome some of the disadvantages of the prior art, it is not the most feasible system in practice.

Although some of the above-described systems for driving a paper machine are contemplated by the present invention, a more realistic approach to the solution of the problem is realized by a system wherein a fixed frequency oscillator is connected through a pulse chopper to a plurality of dividers, each connected to a respective motor of the processing machine. By such a system, the fixed frequency oscillator need only provide an output of 3.6 megahertz in order to achieve a 360 hertz output from the individual dividers. Therefore, this system provides control over the individual motors of the papermaking machine which is highly accurate and which is void of the disadvantages set forth above.

In those systems which employ individual dividers for each of the machine sections, which dividers are adjustable to vary the speed of the motor associated therewith, difficulties may arise during the adjusting interval. The usual divider circuit includes a plurality of binaries having the respective outputs thereof connected to switches. The outputs of the switches are connected to an AND gate for providing a pulse output upon the occurrence of a simultaneous output from each of the switches. If this pulse output from the AND gate is employed to drive a commutating circuit associated with an inverter and a motor, difficulties may arise if the pulse is sustained over a relatively long period of time or if the pulse does not occur for a relatively long period of time.

Either of these two conditions can exist during adjustment of the switches associated with the divider circuit. For instance, if these switches are of the type which made a complete break while moving from one contact to another, and if a pulse is being supplied at the time when such movement is being made, an output will not be realized. Because of the relatively high frequencies involved, it is quite possible that an entire group of such output pulses will be eliminated during the switching processes. Under such conditions, a synchronous motor connected to the inverter will become free running and will probable come out of synchronism and begin operating as an induction motor. With the reoccurrence of output pulses, the motor may not return to its synchronous operation and may continue to operate as an induction motor. Furthermore, transients may be produced which may be detrimental to the components of the circuitry.

On the other hand, if the switches connected to the binaries of the divider are of the shorting type, other difficulties may be encountered. The shorting type of switch is that in which two adjacent contacts make simultaneous connection with the wiper arm of the switch during movement from one contact to the other. During such movement, the two contacts will be shorted together and, depending upon the particular binary to which the switch is connected, the two outputs of the binary may be shorted together and to the input of the subsequent binary stage. Such a condition will result in an erroneous output from the divider circuit, particularly if sustained over any length of time. The greater danger, however, will occur if an output pulse is being delivered during the time that the switches are being changed. Under such a condition, the output pulse may be sustained over a considerable length of time. If this output pulse is connected to the gate of an SCR, for instance, such an output pulse sustained over a considerable length of time may cause destruction of that SCR and possibly the application of a DC voltage to the windings of the synchronous motor. It is apparent from a consideration of the relative times involved as compared to the frequency at which the system is operating, that a considerable number of difficulties can be encountered by the use of mechanical switches to adjust the output of the divider sections.

Still another problem associated with these systems, in general, is that of providing a pulse which is of sufficient power to energize the controlled rectifiers in the inverter sections connected to the individual motors. In order to provide good switching conditions in the inverters, a relatively high power trigger pulse must be developed over a predetermined time period in order to saturate the controlled rectifiers within the shortest time possible or to turn the same off within the shortest time possible. If these requirements are not met, it is possible that the controlled rectifiers may cause transients or other spurious voltages which are not desired in the system. Furthermore, if relatively large currents are being handled by the controlled rectifiers, it is possible to destroy the devices if proper switching voltages and currents are not realized.

One method for providing a trigger pulse which is sufficient to overcome these disadvantages is that of employing two static inverters connected in cascade to one another. The first static inverter receives the output from the divider, usually in the form of relatively short and sharp pulses and provides a square wave output of the same frequency but of higher power. These pulses of higher power are then employed to drive the subsequent static inverter which controls the large amounts of current delivered to the individual motors. Such an arrangement, however, greatly increases the complexity and the cost of the system.

When a synchronous motor is operated at a particular frequency, the voltage applied thereto must be maintained at a predetermined level proportional to the frequency. If the frequency applied to the synchronous motor is increased, the level of voltage applied thereto must also be increased to maintain proper operation of the motor. A major difficulty encountered in those systems which employ a plurality of synchronous motors which are driven from a common source and are driven at different rates is that of maintaining the voltage supplied to the motors proportional to the frequency. For instance, if a plurality of inverters are connected to a common DC source of voltage and are each connected to a separate motor for energization thereof at a different rate with respect to one another, the amplitude of the voltage applied to the motors will be equal to the amplitude of the common DC source. Consequently, only one of the motors in such a system can be operated with the amplitude of the voltage supplied thereto being proportional to the frequency. The other motors of such a system would be operated under adverse conditions, since the amplitude of the voltage supplied thereto is either lesser or greater in proportion to the frequency supplied thereto.

In processing machines which are generally formed of a plurality of separate stations each interconnected with one another to produce a unitary result, it is often desirable to discontinue the operation of one of the stations while maintaining the other stations operative. In addition, it is also desirable to be able to start a particular station at a relatively slow speed and gradually increase that speed until it matches the speed of the other stations in the entire machine. If synchronous motors are employed, it is also desirable to start such motors at a slow speed while in synchronism and to maintain the synchronous operation during increase of the speed to operating speed. The motor can be brought up to the speed of the motors of the other stations and locked into synchronism therewith during operation of the entire machine.

In many instances, during the operation of a processing machine, such as a paper making machine, one or more of the motors connected to separate stations thereof are operating as a "drag" on the system to maintain a proper tension in the material being processed, such as a web of paper. The particular motor which is operating under such conditions will act as a generator, rather than a motor, and will tend to supply energy back to the source. However, due to the switching devices usually employed in speed control circuits for operating such motors, such energy cannot be supplied back to the source. Since the cost of electrical power is an important factor in many processing machines, particularly in paper making machines, it would be desirable to supply power back into the source from those motors which act as generators.

In those systems which employ silicon controlled rectifiers for controlling the application of power to a motor or a plurality of motors, a major difficulty is encountered in rendering the rectifiers nonconductive. This difficulty is particularly apparent in those systems which handle large amounts of power. As a result of the difficulty encountered in rendering the rectifiers nonconductive, the accuracy of the speed of the motors is greatly reduced.

SUMMARY OF THE INVENTION

It is, therefore, an object of the present invention to provide an electronic drive system for multiple section processing machines which is capable of maintaining a fixed ratio of speed between the various sections of the machine and simultaneously capable of adjustment of the speed of the entire machine.

Another object of the present invention is to provide an electronic drive system for a paper making machine which is capable of maintaining a predetermined draw between individual sections of the machine and simultaneously capable of varying the speed of the entire machine while maintaining the speed ratios between the sections fixed.

A specific object of the present invention is to provide an electronic drive system for a paper making machine which is capable of varying the speed of the entire machine by a factor of 10 and varying the ratio between individual stations of the entire machine within a range of at least 10 percent with respect to one another.

A further object of the present invention is to provide an electronic drive system for multisection processing machine which is capable of adjusting the speed ratios between the various sections of the machine and simultaneously capable of varying the speed of the entire machine while maintaining the ratios between the various sections fixed, and in which A high resolution is obtained without the requirement of a high frequency master oscillator.

Still another object of the present invention is to provide an electronic drive system for a multisection processing machine which is not subject to erroneous operation during intervals of adjustment of the speed.

Still another object of the present invention is to provide an electronic drive system for a multisection processing machine wherein the amplitude of the voltage supplied to the individual motors of the machine is proportional to the frequency applied thereto.

And still a further object of the present invention is to provide an electronic drive system for a multisection processing machine which is capable of discontinuing the operation of one section of the machine while maintaining the other sections thereof operative and is further capable of gradually increasing the speed of one section from a complete standstill until it matches the speed of the entire machine.

Yet another object of the present invention is to provide an electronic drive system for a multisection processing machine which is capable of supplying power back to the source for greater economy of operation.

Another important object of the present invention is to provide an electronic drive system for a multisection processing machine which employs silicon controlled rectifiers to control the application of power to the individual motors of the machine and which is capable of supplying a pulse of sufficient power to energize the controlled rectifiers and further capable of causing the controlled rectifiers to be rendered fully nonconductive at the desired times.

A specific feature of the present invention resides in the provision of a variable frequency oscillator connected through a plurality of dividers to a respective motor of a multisection processing machine for enabling, not only control of the speed of each of the individual motors, but control of the entire machine while maintaining the ratio of the speeds between the various sections fixed.

Another feature of the present invention resides in the provision of a fixed frequency oscillator coupled in tandem with a pulse chopper to form in combination therewith a variable frequency oscillator having a very high resolution.

A further feature of the present invention resides in the provision of a register for presetting the individual dividers associated with each motor of a multisection processing machine, which register is capable of changing the divider factor without producing erroneous outputs therefrom.

Still another important feature of the present invention resides in the provision of a novel triggering circuit for the controlled rectifiers of an inverter which eliminates the need for connecting two static inverters in series with one another.

Yet another important feature of the present invention resides in the provision of a circuit for controlling the amplitude of the voltage supplied to the motors such that the voltage amplitude is maintained proportional to the frequency applied thereto.

And yet another important feature of the present invention resides in the provision of a "runup" circuit connected to each of the motors which permits gradual increase of the motor speed from a complete standstill to the desired speed separately of the operation of the other motors in the machine.

Another important feature of the present invention resides in the provision of a novel feedback circuit for power which is generated by one or more of the motors, which power is fed back to the source or to the other motors of the system.

And still another important feature of the present invention resides in the provision of a novel circuit for the controlled rectifiers of an inverter which permits such rectifiers to be rendered completely nonconductive when desired.

These and other objects, features and advantages of the present invention are realized by the general configuration of the present invention which broadly includes a plurality of frequency changing channels each connected between a fixed frequency source of power and a respective motor which is disposed for driving one station of a multisection processing machine and a variable frequency master oscillator connected in common to each of the channels. Each channel includes a rectifier section for converting the variable frequency voltage of the source into a direct current voltage, an inverter section connected to the output of the rectifier section, and a plurality of frequency dividers each connected to an output of the variable frequency master oscillator and to a respective inverter section. The output of each inverter section is connected to a respective motor which is disposed for driving a respective section of a multisection processing machine. In order to realize still other objects, features and advantages of the present invention, it is proposed to form the variable frequency oscillator of a fixed frequency oscillator connected in series with a pulse chopper. Other advantages are realized by the provision of a binary register uniquely connected with each of the frequency dividers for presetting the divider factor therein. Still other advantages of the present invention are realized by a novel circuit for triggering the controlled rectifiers employed in the inverter sections and which apply power to the motors.

Details of the invention and all of the objects, features, and advantages thereof, will be more fully realized and understood from the following detailed description when taken in conjunction with the accompanying drawings wherein:

BRIEF DESCRIPTION OF THE DRAWINGS

FIG. 1 is a schematic diagram of a paper making machine with which the electronic drive system of the present invention has particular application;

FIG. 3 is a block diagram of the polyphase variable frequency circuit for controlling the inverter circuit illustrated in FIG. 2 and constructed in accordance with the principles of the present invention;

FIG. 4 is a partial schematic and partial block diagram of the rectifier circuit illustrated in FIG. 2 and employed for converting three-phase alternating current voltage to direct current voltage which is proportional in amplitude to the frequency of the voltage applied to the respective motor connected thereto;

FIG. 5 is a partial schematic and partial block diagram of the inverter bridge circuit illustrated in FIG. 2 which converts direct current voltage into alternating current voltage at a frequency proportional to the desired speed of rotation of the motor connected thereto;

FIG. 6 is a diagram of the waveforms of the alternating current voltage at the output of the inverter bridge circuit illustrated in FIG. 5;

FIG. 7 is a partial schematic and partial block diagram of the regenerator circuit employed in the system illustrated in FIG. 2 for supplying power back to the alternating current source when the respective motor of that channel operates as a generator;

FIG. 9 is a schematic diagram of the direct current voltage regulator employed in the system illustrated in FIG. 2;

FIGS. 10 and 11 are schematic diagrams of the phase control circuits employed in the system illustrated in FIG. 2;

FIG. 14 is a block diagram of one form of a variable frequency oscillator which can be employed in the system illustrated in FIG. 3;

FIG. 15 is a block diagram of the "runup" speed control employed in the system illustrated in FIG. 3;

FIG. 16 is a schematic diagram of the "runup" multivibrator employed in the speed control system illustrated in FIG. 15;

FIG. 17 is a schematic diagram of the clock control flip-flop employed in the speed control circuit illustrated in FIG. 15;

FIG. 18 is a block diagram of the speed control logic employed in the system illustrated in FIG. 3; and FIG. 19 is a block diagram of the multiphase generator employed in the system illustrated in FIG. 3.

Like reference numerals throughout the various views of the drawings are intended to designate the same or similar elements.

DESCRIPTION OF THE PREFERRED EMBODIMENTS

Figure 2:
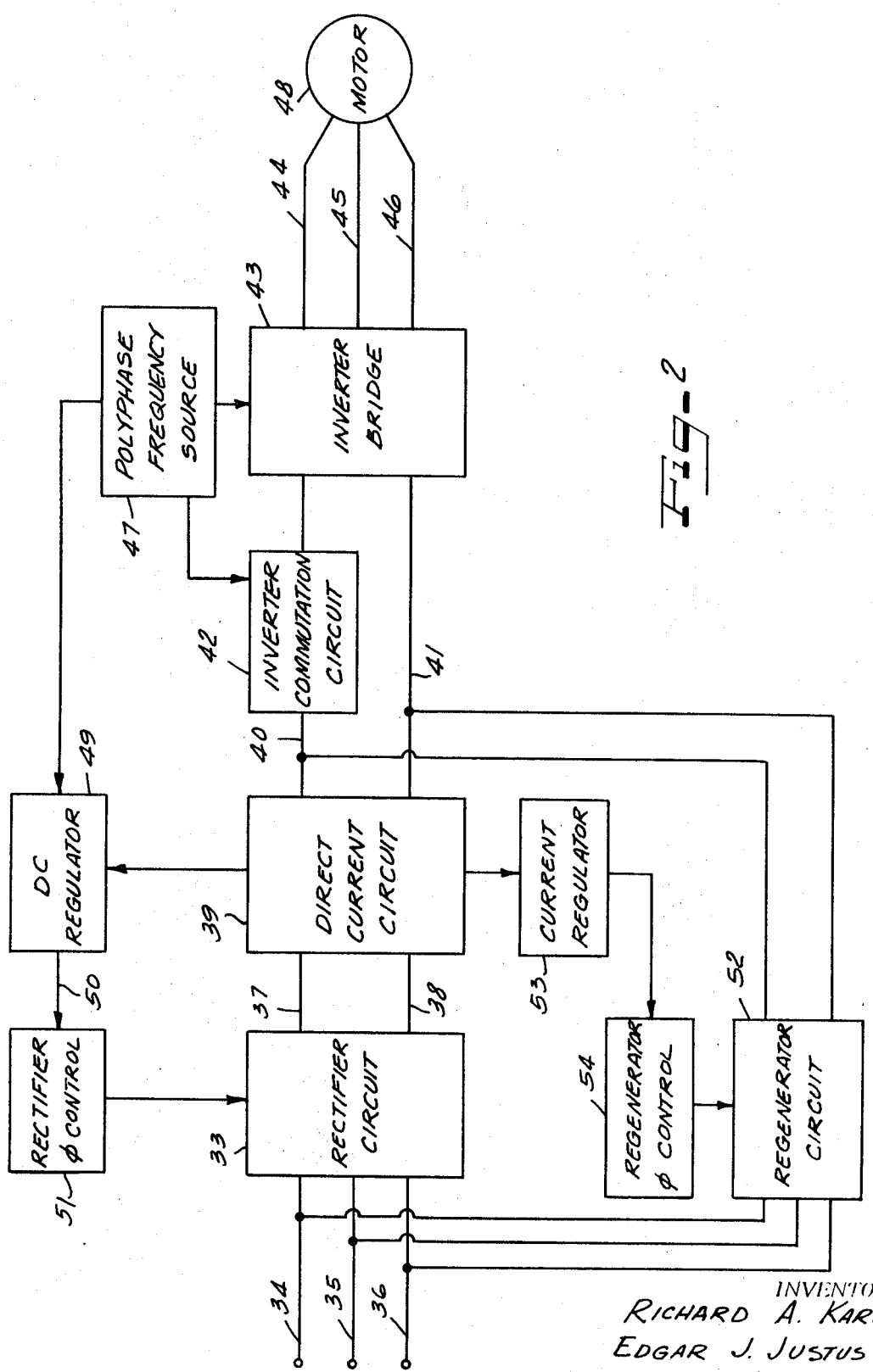
FIG. 2 is a block diagram of the rectifier and inverter circuits and the various control circuits therefor which provide the various advantages and features of the present invention and which are constructed in accordance with the principles of the present invention.

The schematic illustration of FIG. 1 represents the various sections of a paper making machine which may be driven by an electronic drive system constructed in accordance with the principles of the present invention. In particular, the papermaking machine is generally formed of a Fourdrinier section 25, a first press section 26, a second press section 27, a third press section 28, a first dryer section 29, a second dryer section 30, a calender section 31, and a winder 32. Each of these sections may be driven by one or more motors energized from an electronic drive system or speed-control system.

As set forth hereinabove, provision must be made for changing the speed of the paper machine, either uniformly of the machine as a whole or of any section independently of others. Every particular type and weight of paper, coupled with the stock from which it is made, has a definite speed best suited to the requirements of that paper. Variations in both the stock furnished and the treatment given it has an influence on the speed at which machines can be run. The speeds of the various sections of these machines also must be adjustable, but independently of each other. When the sheet is wet and passes through the presses 26, 27, and 28, it stretches lengthwise and contracts sidewise. During the last stage of drying in the second dryer section 30, the sheet contracts both ways. Thus, the second and third presses 27 and 28 must run faster than the first press 26, and the last section of the dryers, second dryer 30, must run more slowly than the preceding section. These differential changes often must be altered repeatedly during the initial startup of the paper machine and the alteration must be continued until the machine "settles down." This "settling down" may also take several hours after changing over from one grade of paper to a very different one.

The term "draw" refers to the tension of the paper between sections of a paper machine. When a change in the tension tightens the sheet too much, the paper will break unless an adjustment in the speed is made to compensate for the change. If the draw slackens, other troubles occur such as wrinkling. Once a machine is set to produce a sheet of paper at the right speed, of great importance is the maintenance of constant operating conditions.

Fig. 2 is a block diagram of the rectifier and inverter circuits and the various control circuits associated therewith for converting a voltage from a common voltage source of 60 Hertz into a voltage of desired frequency, which voltage is proportional in its amplitude to the frequency and the desired frequency is proportional to the desired rotational speed of the motor. The arrangement illustrated in FIG. 2 is employed for driving only one motor of the processing machine. Each motor which operates at a speed different from the speed of all the other motors requires its own individual rectifier and inverter channel, such as the one illustrated in FIG. 2. Identical arrangements to that illustrated in FIG. 2 are employed for each motor which is to be driven at a different speed. If two or more motors are driven at the same speed, the same rectifier and inverter channel, such as the one illustrated in FIG. 2, may be employed for all such motors. For instance, two or more motors can be connected at an output of the circuit illustrated in FIG. 2.

As shown in FIG. 2, a rectifier circuit 33 is connected at its inputs to a three-phase alternating current source of 60 hertz on the lines 34, 35 and 36. The rectifier circuit 33 converts the alternating current voltage at its input into direct current voltage at its output and delivers such pulsating DC voltage onto the lines 37 and 38. A direct current circuit 39 filters the voltage on the lines 37 and 38 develops a direct current voltage of constant amplitude on the output lines 40 and 41 thereof.

The direct current voltage on the lines 40 and 41 is connected through an inverter commutation circuit 42 to an inverter bridge 43. The inverter bridge 43 converts the direct current voltage on the lines 40 and 41 into three-phase alternating current voltage at any desired frequency on lines 44, 45 and 46. The frequency of the voltage supplied by the inverter bridge 43 is controlled by a polyphase frequency source 47 connected thereto. The frequency of the voltage at the output of the inverter bridge 43 is proportional to the speed at which a synchronous motor 48 connected thereto is to be driven. Adjustment of the frequency source 47 changes the frequency of the inverter 43 output and accordingly changes the rotational speed of the motor 48. If the motor 48 is to be operated in synchronism through a wide speed and frequency range, the voltage applied thereto must be maintained at a predetermined amplitude which is proportional to such frequency. In order to permit the rectifier circuit 33 to deliver a direct current voltage having an amplitude which is proportional to the frequency of the voltage connected to the motor 48, a feedback loop is employed for controlling the conduction cycles of the rectifier circuit 33. The feedback loop includes a direct current regulator 49 having respective inputs thereof connected to an output of the polyphase frequency source 47 and to the direct current circuit 39. A voltage is produced at an output 50 of the DC regulator 49 which is proportional to the frequency of the polyphase frequency source 47. The output on the line 50 is connnected to a rectifier phase control circuit 51 which controls the firing angle of the controlled rectifiers within the rectifier circuit 33 in accordance with such output of the DC regulator 49. This described feedback arrangement permits continuous monitoring of the frequency of the voltage applied to the motor and variation of the amplitude of that voltage. Since the direct current voltage at the output of the rectifier circuit 33 is varied in accordance with the established frequency and such voltage is supplied to the inverter bridge 43, the output voltage of the inverter 43 will be varied accordingly.

Since the consumption of power contributes to a large extent to the cost of operating many processing machines, such as a paper making machine, it is often desirable to be able to feed energy back into the common 60 hertz source. Feeding back energy into the source can occur when a particular motor, such as one of the motors 48, is producing a "drag" in the processing machine and performs as a generator. However, the feeding back of energy into the 60 hertz source has, until this time, not been feasible due to the switching arrangement employed in the inverter and rectifier circuits of the prior known systems.

The present invention overcomes this difficulty by the provision of a regenerator circuit 52 connected between the DC voltage on the lines 40 and 41 and the 60 hertz source of voltage on the lines 34, 35 and 36. The inverter bridge 43, as will be explained hereinbelow, is constructed to permit the flow of current from the lines 44, 45 and 46 to the lines 40 and 41. However, the current which is generated by the motor 48 cannot pass through the rectifier circuit 33. Consequently, the reverse flow of current is sensed by a current regulator 53 which in turn controls a regenerator phase control 54 in accordance with the reversal of current in the direct current circuit 39. The phase control 54 controls the firing of the controlled rectifiers within the regenerator circuit 52 to permit the flow of current from the lines 40 and 41 to the lines 34, 35 and 36. Consequently, whenever the motor 48 is acting as a generator due to the operation of the processing machine in which it is employed, current can be fed back to the 60 hertz source for conserving energy. It can be readily appreciated that, since a plurality of circuits each identical to the one illustrated in FIG. 2 are employed, energy will not necessarily be supplied back to the 60 hertz source, but rather to another rectifier and inverter circuit associated with another motor of the processing machine.

With reference to FIG. 3, there is shown a schematic diagram of one preferred form of the polyphase frequency sources 47 which are employed to control the frequency of the output voltage from the inverter bridges 43. Since a plurality of channels or polyphase frequency sources 47 are illustrated in FIG. 3, like reference numerals will be employed to designate the same elements in respective channels, and the letter a will be employed with those numerals designating elements of channel A and the letter b will be employed with those numerals designating the same elements of channel B. A variable frequency master oscillator 55 is common to all of the channels connected to all of the motors employed for driving the multisection processing machine.

The variable frequency oscillator 55 provides an output on a line 56 which consists of a series of pulses. These pulses from the output of the oscillator 55 reoccur at a relatively high frequency of, for example, 1 megahertz. The variable frequency oscillator 55, which forms the master control for the system, may take the form of various structures, including, but not limited to the following:

I. A variable frequency oscillator, such as
 1. An LC oscillator with a variable L,
 2. An LC oscillator with a variable C,
 3. A bridged T or parallel T or phase shift oscillator with a variable R or C,
 4. A bridged T or parallel T or phase shift oscillator with a variable R or L,
 5. Variable relaxation oscillators,
 6. Variable multivibrators, and
 7. Variable integrators;

II. A fixed frequency oscillator followed by dividing, hetrodyning, and filtering circuits in the arrangement known in the electronics field as digital frequency synthesis;

III. A fixed frequency oscillator followed by analogue counting circuits acting as a variable analogue divider;

IV. A variable oscillator forced to match the divided output of a fixed oscillator by means of a servo loop; and V. A fixed frequency oscillator followed by digital counting circuit acting as a variable digital divider.

The fixed frequency oscillators mentioned above may be formed by mechanical resonant oscillators, such as a fork oscillator, magnetostrictive oscillators, piezoelectric crystal oscillators, LC resonant oscillators, RC or RL phase shift oscillators including bridge types, parallel T and bridged T, and relaxation oscillators.

There are several methods for accomplishing digital division of the output frequency of a fixed frequency oscillator, including:

I. A circuit which creates one output pulse for every N input pulses: and

II. A circuit which eliminates N of every M input pulses allowing M–N pulses to appear as output pulses therefrom.

The output from the variable frequency oscillator 55 on the line 56 is connected to an input of a "runup" speed control circuit 57. The "runup" speed control circuits 57a and 57b permit the respective motors 48a and 48b to be gradually increased from a standstill to operating speed while maintaining synchronous operation. The operation of the "runup" speed control circuits 57a and 57b will be explained in greater detail hereinbelow. An output of the speed control circuit 57 is connected to a divider circuit 58 which is connected to a plurality of gates represented by the block generally designated with the reference numeral 59.

The gates 59 are connected to the divider circuit 58 for setting the division factor therein. The gates 59 are provided with a preset number from a preset register 60 which, when that number is reached in the division, provides one or more output pulses from the divider circuit 58. The preset established by the gates 59 is altered by a signal supplied thereto from the preset register 60. The registers 60 are stepped in one direction or the other for changing the preset number by means of an individual register adjust circuit 61. If the preset in the gates 59 is not changed during the time when an output pulse is delivered at an output of the dividers 58, no ambiguities will result due to the change being effected therein. This result is accomplished by circuitry which will be explained hereinbelow.

The preset number which is established by the preset register 60 is displayed on a panel 62. When a change is to be effected in the division factor of the dividers 58, the register adjust circuit 61 is actuated and the change is effected through the preset registers 60 and the gates 59. This change is reflected visually by the panels 62.

The output of the dividers 58 is connected to a multiphase generator 63 which preferably produces a six-phase output signal for ultimately producing a three-phase bipolar signal for connection to the individual motors. The six-phase signal from the multiphase generator 63 is connected to the inverter bridges 43 for converting the DC voltage on the lines 40 and 41 into a three-phase bipolar voltage on the lines 44, 45 and 46.

The embodiment illustrated in FIG. 3 of the present invention provides all of the functions and relationships required by the paper machine illustrated in FIG. 1. By adjustment of the output of the variable frequency oscillator 55, the speed of the entire machine can be adjusted while the ratio of the speeds between the individual sections remains constant. Furthermore, if the "draw" between sections of the processing machine must be changed, adjustment of one of the dividers 58 can be effected for changing the speed of the respective section of the machine without altering the speed of the other sections. As s previously mentioned, this adjustment is effected through the preset registers 60.

FIG. 4 is a partial schematic and partial block diagram of the rectifier circuit illustrated in FIG. 2 which is employed for converting three phase alternating current voltage to direct current voltage. The three-phase voltage from the common source of power is supplied to the lines 34, 35 and 36 and is converted to direct current voltage on the lines 37 and 38. Since each phase of the common source of power on each of the lines 34, 35 and 36 is connected to the lines at 37, 38 through identical circuits, the same reference numeral will be employed to designate the same structures with the letters $a$ through $f$ employed to distinguish the elements on the drawings having the same reference numerals.

Each of the lines 34, 35 and 36 are connected through a diode 64 and a silicon controlled rectifier 65 in series with one another to the line 37, with the diodes 64$a$—$c$ and the silicon-controlled rectifiers 65$a$—$c$ being poled to produce a positive voltage on the line 37. Each of the lines 34, 35 and 36 are also connected through diodes 64$d$—$f$ and the silicon-controlled rectifiers 65$d$—$f$ in series with one another to the line 38. However, the diodes 64$d$—$f$ and the silicon-controlled rectifiers 65$d$—$f$ are poled to produce a negative voltage on the line 38 with respect to the voltage produced on the line 37.

A resistor 66 is connected in parallel with the diode 64 and a resistor 67 is connected in parallel with the silicon-controlled rectifier 65. A gate control circuit 68 is connected to the gate electrode of the silicon-controlled rectifier 65 to control the firing angle or conduction cycle thereof. A source of power at a predetermined frequency $F_1$ is connected to the gate control circuit 68 at a terminal 69. The gate control circuit 68 is connected in parallel with the series connected diode 64 and SCR65 through a resistor 70 to sense the voltage on the anode of the SCR65. Another input of the gate control circuit 68 is connected to an output of a phase control circuit 71, which is in turn connected to the direct current regulator 49 via a terminal 73 and to a source of power of predetermined frequency $F_2$ on a terminal 74. The phase control circuits 71$a$ and 71$d$ are connected to the line 34 by means of a resistor 72$a$ to provide the proper phase relationship between an output thereof and the phase existing on the line 34. In a similar manner, the phase control circuits 71$b$ and 71$e$ are connected to the line 35 by means of a resistor 72$b$ and the phase control circuits 71$c$ and 71$f$ are connected to the line 36 by means of a resistor 72$c$.

The phase control circuit 71 determines the point at which the silicon-controlled rectifier 65 will fire and the gate control circuit 68 provides a high-energy pulse at the proper instant to fire the silicon control rectifier 65.

FIG. 5 is a partial schematic and partial block diagram of inverter bridge circuit 43 illustrated in the block diagram of the FIG. 2 and employed for converting direct voltage to three-phase alternating current voltage having a desired frequency.

In FIG. 4, a direct current voltage is developed on the lines 37 and 38 which is supplied, as shown in FIG. 2, to a direct current circuit 39 which may include, for example, several large capacitors for storing the charge of the direct current voltage thereon. The output of the direct current circuit 39 on lines 40 and 41 is also a direct current voltage.

As illustrated in FIG. 5, the direct current voltage on the lines 40 and 41 is converted into a three-phase alternating current voltage on the lines 44, 45 and 46 which are in turn connected to the motor 48. With the exception of the inverter commutation circuit 42 being connected in series with the line 40, the lines 40 and 41 are connected through identical circuits to the lines 44, 45 and to 46. Consequently, the same reference numerals will be employed to designate the same structures in FIG. 5 with the letters $a$ through $f$ employed to distinguish the elements on the drawing having the same reference numeral. The inverter commutation circuit 42 is connected in series between the line 40 and a line 75 and provides a voltage pulse for rendering the silicon-controlled rectifiers in the inverter bridge circuit 43 nonconductive at the desired times. Accordingly, the silicon control rectifiers employed in the inverter bridge circuit 43 will not have indefinite turn off at times as is common in the prior art and will be rendered nonconductive at a definite time as prescribed by the inverter commutation circuit 42. The operation of the inverter commutation circuit 42 is explained in greater detail in the detailed description of the FIG. 8.

The line 75 is connected to each of the lines 44, 45 and 46 by means of a diode 76 and a silicon-controlled rectifier 77 connected in series with one another. A resistor 78 is connected in parallel with the silicon-controlled rectifier 77. The diodes 76$a$—$c$ and the silicon control rectifiers 77$a$—$c$ are poled to permit positive current flow from line 75 to each of the lines 44, 45 and 46 respectively. An SCR gate control circuit 80 is connected to the gate electrode of the silicon control rectifier 77 to control the firing angle or conduction cycle thereof. The gate control circuit 80 is connected in parallel with the series connected diode 76 and SCR 77 through a resistor 81 to sense the voltage on the anode of the SCR 77. A source of power at a predetermined frequency $F_1$ is connected to the gate control circuit 80 at a terminal 82.

As illustrated in FIG. 2, the polyphase frequency source 47 is connected to the inverter bridge 43 to control the frequency of the voltage developed on the lines 44, 45 and 46. The polyphase frequency source 47 therefore, produces a plurality of voltages which are employed for controlling the conduction cycle of each of the silicon-controlled rectifiers 77$a$—$f$ illustrated in FIG. 5. In particular, the polyphase frequency source 47 produces six signals which are connected to a respective one of the gate control circuits 80$a$—$f$ by means of the terminals 83$a$—$f$. With the exception of the inputs on the terminals 83$a$—$f$, the gate control circuits 80$a$—$f$ illustrated in FIG. 5 are identical to the gate control circuits 60$a$—$f$ illustrated in FIG. 4.

As mentioned above, the diodes 76$a$—$c$ and the silicon-controlled rectifiers 77$a$—$c$ are poled to permit positive current flow from the line 75 to the lines 44, 45 and 46 respectively. On the other hand, the diodes 76$d$—$f$ and the silicon-controlled rectifiers 77$d$—$f$ are poled to permit positive current flow from the lines 44, 45 and 46 respectively to the line 41.

In the preferred embodiment of the present invention, tow signals are supplied simultaneously from the polyphase frequency source 47 to the inverter bridge circuit 43, such that a nearly sinusoidal voltage appears on lines 44, 45 and 46. In particular, each of the silicon-controlled rectifiers 77 are rendered conductive for a 180° period during each 360° cycle. In the present structure, SCR 77$a$ and 77$e$ are made conductive during a first 60° portion of a cycle; SCR 77$a$ and 77$f$ are made conductive during a second 60° portion; the SCR 77$b$ and 77$f$ are made conductive during a third 60° portion; etc. In this fashion, a nearly sinusoidal approximation is achieved of the voltage developed on lines 44, 45 and 46.

In FIG. 6, the voltages produced on lines 44, 45 and 46 are designated by reference numerals 84, 85 and 86 respectively. As shown in FIG. 6, these voltages closely approximate a sinusoidal voltage. The positive portions of the voltages 84, 85 and 86 are generated by SCR's 77a—c, respectively, and the negative portions of the voltages 84, 85 and 86 are generated by SCR's 77d—f, respectively.

As previously mentioned, a particular motor connected to an output of the inverter bridge circuit 43 may be acting as a generator due to its acting as a "brake" on the material in the processing machine. Under such conditions, current will be supplied to the terminals illustrated in FIG. 5 which are connected to lines 44, 45 and 46. In order to recover the energy produced by a particular motor acting as a generator, the diodes 87a—c are connected between the lines 44, 45 and 46, respectively, to line 40 to permit current flow in a positive direction therebetween. Diodes 87d—f are connected between the line of 41 and the lines 44, 45 and 46, respectively, to complete the circuit and to permit current from a particular motor 48 to be supplied to circuit 39.

As previously mentioned, the energy produced by a particular motor 48 acting as a generator is recovered by means of a regenerator circuit 52. FIG. 7 is a partial schematic and partial block diagram of the regenerator circuit 52 illustrated in FIG. 2 which is employed for converting direct current voltage developed by the rectifiers 87a—f into three-phase alternating voltage and for supplying such voltage back to the source connected to the lines 34, 35 and 36. Since identical circuits are employed for each phase associated with each line 34, 35 and 36, the same reference numeral will be employed to designate the same structures with the letters a through f employed to distinguish the elements on the drawing having the same reference numeral. The line 40 is connected through a diode 88 and a silicon-controlled rectifier 89 connected in series of one another to one of the lines 34, 35 and 36. A resistor 90 is connected in parallel with the diode 88 and a resistor 91 is connected in parallel with the silicon-controlled rectifier 89. A gate control circuit 92 is connected to the gate electrode of the silicon-controlled rectifier 89 and is also connected through a feedback resistor 93 to the anode of the diode 88 and also the cathode of the silicon-controlled rectifier 89. An input to the gate control circuit 92 is supplied from a phase control circuit 93 which determines the points at which the silicon-controlled rectifier 89 will be rendered conductive.

A source of power of frequency $F_2$ is supplied to the phase control circuit 93 at a terminal 94. The phase control circuit 93 is also connected to one of the lines 34, 35 and 36 through a resistor 95, which connection maintains the proper phase relationship between the phase control circuits 93a—f.

The current regulator 53 illustrated in FIG. 2 is responsive to current flowing from the motor 48 when such motor is performing as a generator. An output of the current regulator 53 is supplied to the phase control circuit 93 at a terminal 96 thereof. As a result, when current is flowing from the motor 48, when it is acting as a generator, the phase control circuit 93 will be energized to control the conduction of the silicon control rectifiers 89 and permit the flow of current to the source on lines 34, 35 and 36.

A major problem encountered in circuits which employ silicon-controlled rectifiers as switches for controlling the application of power is that of rendering the silicon-controlled rectifiers nonconductive at a definite time. This difficulty is extremely troublesome when it is encountered in the operation of inverter circuits which employ silicon-controlled rectifiers for controlling the application of power to a motor or a similar load device. If a particular silicon-controlled rectifier is not rendered nonconductive at a particular time, the voltage supplied to the motor or load connected thereto will not remain the same as the conductive cycle of the silicon-controlled rectifier. Consequently, if the motor is connected to such an inverter circuit, for instance, it may lose its synchronous mode of operation and its speed, in relation to the speed of the other motors in the processing machine, may vary greatly.

Figure 8:
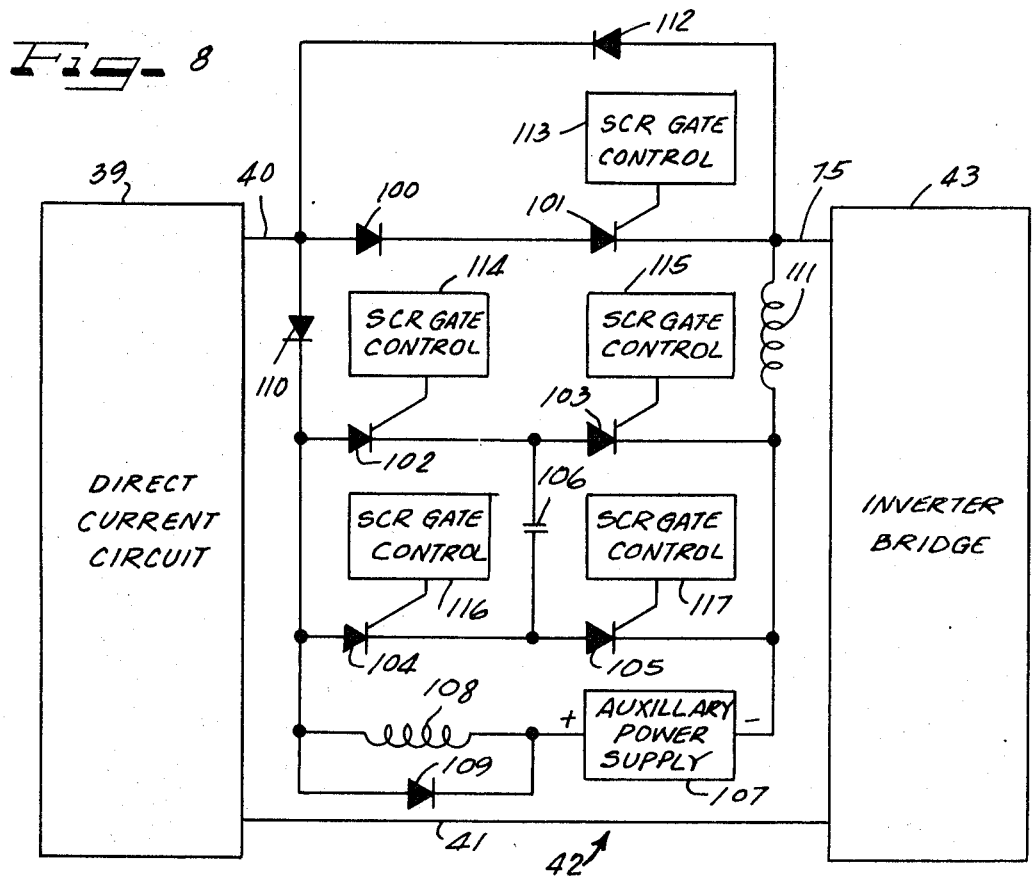
FIG. 8 is a schematic diagram of the inverter commutation circuit employed in the system illustrated in FIG. 2 for ensuring proper commutation of the switching devices in the inverter bridge circuit connnected thereto.

In order to overcome this difficulty, the inverter commutation circuit 42 is employed in series between the direct current circuit 39 and the inverter bridge circuit 43. In FIG. 8 is illustrated a partial block diagram and a partial schematic diagram of the inverter commutation circuit 42. As shown in FIG. 8, the inverter commutation circuit 42 includes a diode 100 and a silicon-controlled rectifier 101 connected in series with one another between the direct current circuit 39 and the inverter bridge circuit 43. The diode 100 and the SCR 101 are poled to permit current to flow from the direct current circuit 39 to the inverter bridge circuit 43. It is evident from the schematic diagram illustrated in FIG. 5 that the silicon-controlled rectifier 101 is connected in series with each of the SCR's 77a—f. Consequently, it is necessary for the SCR 101 to be conductive during those times when the SCR's 77a—f are also conductive. From consideration of the wave forms illustrated in FIG. 6, however, it would appear that the SCR 101 must be conductive at all times, since one of the SCR's 77a—f is conductive at any given point in time. However, in operation, the inverter commutation circuit 42 causes an instantaneous cessation of the current flow through all of the SCR's 77a—f. The cessation of current flow through the SCR 77a—f caused by the inverter commutation circuit 42 is accomplished over a time period which is only sufficient to cause any one of the SCR's 77a—f to become nonconductive if no trigger signal has been supplied to the gate electrode thereof. In order to provide instantaneous cessation of current flow through the SCR's 77a—f, the SCR 101 is back biased for a very short interval of time such that current flow therethrough will cease for that very short interval of time. Since the currents flowing through the SCR 77a—f must flow through the SCR 101, any cessation of current flow through the SCR 101 will cause the cessation of current flow through the SCR 77a—f.

This brief cessation of current flow through the SCR 101 is produced by the remaining portion of the inverter commutation circuit 42 connected in parallel with the diode 100 and the SCR 101. In particular, a bridge circuit is formed of a plurality of silicon-controlled rectifiers 102, 103, 104 and 105. A capacitor 106 is connected across one diagonal of the bridge circuit such that a charge is developed thereon when a pair of the SCR's 102—105 which in opposite legs of the bridge circuit are rendered conductive. An auxiliary power supply 107 is connected in a series with an inductor 108 having a diode 109 connected in parallel therewith. The series connected power supply 107 and inductor 108 are connected across the other diagonal of the bridge circuit to charge the capacitor 106 in one portion of the cycle of operation and to act in series with the capacitor 106 during another portion of the cycle of operation to back bias the SCR 101.

The line 40 which constitutes the positive side of the direct current circuit 39 is connected through a diode 110 to the anodes of the SCR's 102 and 104. The line 75 which constitutes the positive side of the inverter bridge circuit 43 is connected through an inductor 111 to the cathodes of the SCR's 103 and 105. A diode 112 is connected in parallel with the diode 100 and the SCR 101 and is poled to permit the flow of current from the line 75 to the line 40. It is to be understood that diode 112 includes a small amount of forward resistance sufficient to support a small voltage drop thereacross. If desired, a small resistor may be placed in series with the diode 112.

The gate electrodes of SCR's 101, 102, 103, 104 and 105 are connected to a respective SCR gate control circuit 113, 114, 115, 116 and 117. Each of the SCR gate control circuits 113—117 render the respective SCR's 101—105 conductive in synchronism with the conduction of the SCR's 77a—f, in the inverter bridge circuit 43 illustrated in FIG. 5. The polyphase frequency source 47 (see FIGS. 2 and 19) delivers six outputs therefrom, each of which provides a trigger pulse for a respective one of the SCR's 77a—f illustrated in FIG. 5. Each one of the outputs from the polyphase frequency source 47 corresponds to the positive and negative positions of the wave forms 84, 85 and 86 illustrated in FIG. 6. The outputs of the polyphase frequency source 47 are also connected to the SCR gate control circuits 113—117 to control the conduction of the SCR's 101—105. In particular, each output of the polyphase frequency source 47 is connected to the SCR gate control circuit 113, whereas alternate successive outputs of the polyphase frequency source 47 are connected in common to a pair of the SCR gate control circuits 114—117 connected in opposite legs of the bridge circuit.

Figure 12:
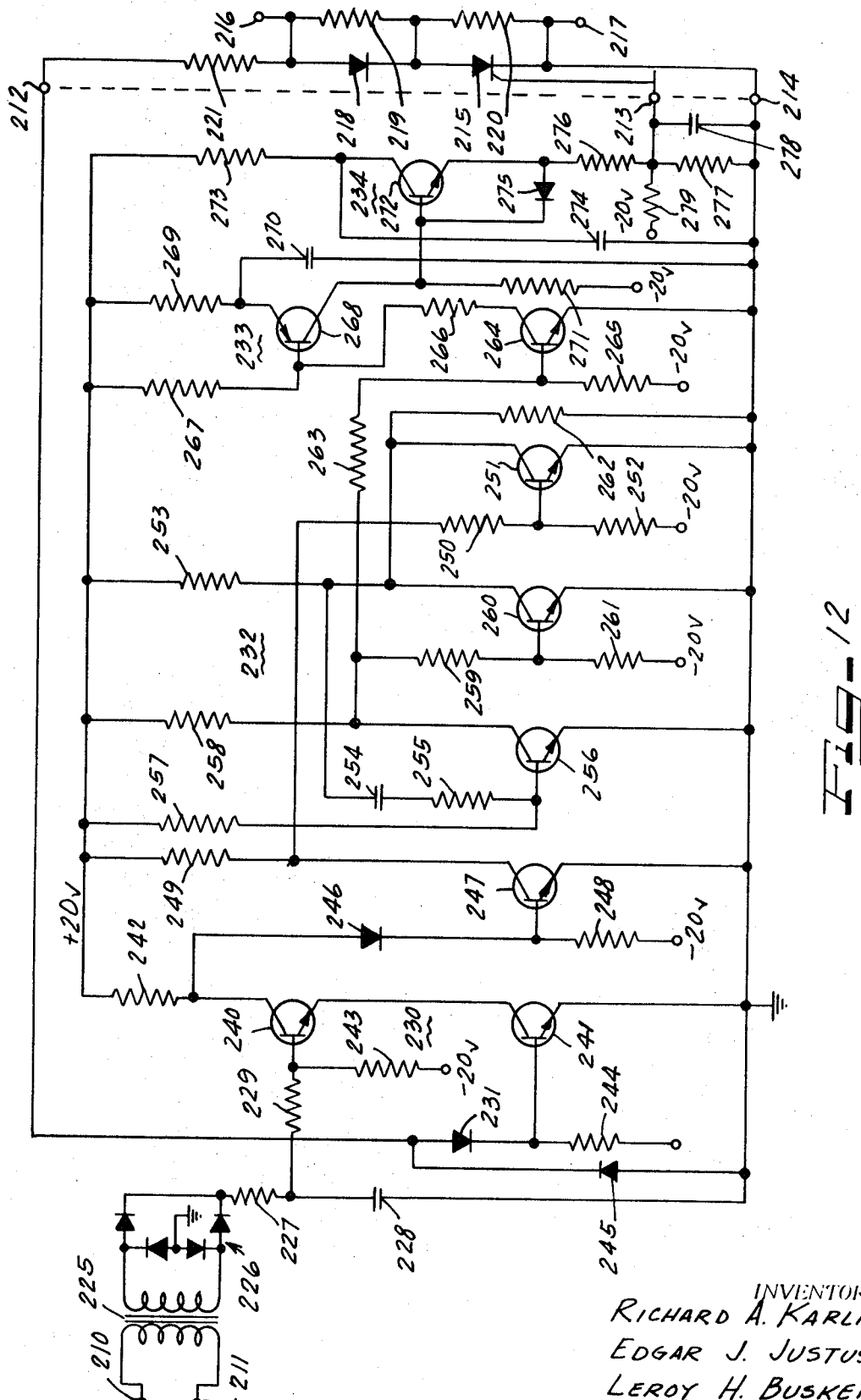
FIG. 12 is a schematic diagram of the SCR gate control circuits employed in the rectifier circuit illustrated in FIG. 4, the inverter bridge circuit illustrated in FIG. 5, and the regenerator circuit illustrated in FIG. 7.

As illustrated in FIG. 19, the respective outputs of the polyphase generator illustrated therein are designated A+, B+, and C+ and A−, B− and C−. If the SCR gate control circuits 114 and 117 are connected to the outputs A+, B+ and C+, the SCR gate control circuits 115 and 116 will be connected to the respective outputs A−, B− and C−. Since the respective outputs of the polyphase generator illustrated in FIG. 19 are produced in the order illustrated in FIG. 6, the SCR's 102 and 105 will be rendered conductive during a first time. When an output is produced on the A+ output terminal, the SCR's 103 and 104 will be rendered conductive. When an output pulse is produced on the output terminal C−, the SCR's 102 and 105 will again be rendered conductive. When an output is produced on the output terminal B+, the SCR's 103 and 104 will be again rendered conductive and so on. Since the SCR gate control circuits 113—117, which are illustrated in FIG. 12 of the drawings, produce a trigger pulse of relatively short time duration, the existence of an output on the output terminals of the circuit illustrated in FIG. 9 will not maintain the respective SCR's 102—105 conductive unless the anode of such SCR's is positive with respect to the cathode thereof.

In operation, therefore, it will be assumed that the capacitor 106 is charged to a predetermined voltage level approximately equal to the voltage of the auxiliary power supply 107. It will be assumed that this voltage is positive on the anode of the SCR 105 and negative on the anode of the SCR 103. At the beginning of the first time period, the SCR's 102 and 105 will be rendered conductive causing current to flow through a path defined by the capacitor 106, the inductor 111, the diode 112, and the diode 110. This current flow is caused by the discharge of the capacitor 106 and is effective to back bias the SCR 101 resulting in the cessation of current flow therethrough. Since the capacitor 106 discharges at a relatively fast rate, the SCR 101 will be back biased for only a relatively short time period. At the end of this time period, the capacitor 106 will begin to charge with a voltage thereon which is positive on the anode of the SCR 103 and negative on the anode of the SCR 105. At the beginning of the subsequent time period, the SCR's 103 and 104 are rendered conductive again causing current flow through a path defined by the capacitor 106, the inductor 111, the diode 112, and the diode 110.

The inductor 108 suppresses the flow of large amounts of the current which would result by the connection of the capacitor 106 essentially in parallel with the auxiliary power supply 107 in a path in which the voltages thereon are additive. The diode 109 suppresses oscillations which may result with the reversal of the voltage on the inductor 108 during the charging and discharging of the capacitor 106. The inductor 111 is also effective to suppress large amounts of current flow caused by the discharge of the capacitor 106 and is effective to time the duration of the back bias produced on the SCR 101. With the alternate detriggering of the SCR's 102 and 105 at the beginning of a first time period and the triggering of the SCR's 103 and 104 at the beginning of a subsequent time period, it can be appreciated that the charge developed on the capacitor 106 by virtue of the connection of the auxiliary power supply 107 thereto is effective to back bias the SCR 101 during the subsequent discharge thereof.

In order to operate a synchronous motor at a particular frequency, the voltage applied thereto must be maintained at a predetermined level proportional to that frequency. If the frequency of the voltage applied to the synchronous motor is changed, the level of the voltage applied thereto must also be changed in the same direction to maintain proper operation of the motor. Since the level of the voltage applied to the motor 48 (see FIG. 2) is determined by the duration of the conduction cycles of the SCR's in the rectifier circuit 33, any change in the frequency of the voltage of the voltage applied to the motor 48 necessitates a change in the conduction cycles of the SCR's in the inverter circuit 33. This function is performed by the direct current regulator 49 connected between the polyphase frequency source 47 and the rectifier phase control 51, which rectifier phase control 51 controls the conduction cycle of the SCR's in the rectifier circuit 33. More particularly, a voltage is produced at the output 50 of the direct current regulator 49 which is proportional to the frequency of the polyphase frequency source 47. The output on the line 50 is connected to the rectifier phase control circuit 51 which controls the firing angle or conduction cycle of the control rectifiers within the rectifier circuit 33 in accordance with such output of the direct current regulator 49. The direct current regulator 49, therefore, continuously monitors the frequency of the voltage applied to the motor 48 and provides a control signal for varying the amplitude of that voltage in accordance with the frequency thereof. Since the direct current voltage at the output of the rectifier circuit 33 is varied in accordance with the established frequency, and such voltage is supplied to the inverted bridge circuit 43, the output voltage of the inverted bridge circuit 43 will be varied accordingly.

A schematic diagram of the direct current voltage regulator 49 is illustrated in FIG. 9. As shown therein, a signal from the polyphase frequency source 47 which is of the same frequency as the voltage supplied to the motor 48 is connected to a terminal 120 is coupled through a diode 121 to the midpoint of a voltage divider consisting of a pair of resistors 122 and 123. The midpoint of the voltage divider circuit is connected through a diode 124 to the base of a transistor 125 which amplifies the signal at the collector electrode thereof. The amplified signal is coupled through a resistor 126 and a capacitor 127 to the junction of a pair of diodes 128 and 129. The diode 129 is connected through a pair of resistors 130 and 131 to the base of a transistor 132. When the conduction level of the transistor 125 is reduced by the application of a signal at the base electrode thereof, the capacitor 127 develops a charge thereon by virtue of the connection of the collector electrode of the transistor 125 through a resistor 133 to a source of voltage, for example, positive 24 volts. When the conduction level of the transistor 125 increases due to the signal supplied to the base thereof, the capacitor 127 attempts to discharge therethrough, but such discharge is blocked by the diode 128 and must follow a path through the diode 129. This discharge of the capacitor 127 produces a voltage drop across the resistor 130 which is coupled to the base of the transistor 132 through the resistor 131.

The level of the voltage developed on the lines 40 and 41 at the output of the direct current circuit 39 is also sensed by the direct current voltage regulator 49. A pair of resistors 135 and 136 are connected across the lines 40 and 41 to form a voltage divider for supplying a proportionate amount of that voltage to the vase of the transistor 132. In particular, a connection point of the resistors 135 and 136 is connected through a potentiometer 137 and a resistor 138 to ground or reference potential. The movable contact of the potentiometer 137 is adjustable to change the level of the voltage supplied to the transistor 132 from the direct current circuit 39. The movable contact of the potentiometer 137 is connected through a resistor 139 to the connection point between the resistors 130 and 131, which latter resistor is connected to the base of the transistor 132. A further adjustment is provided by a potentiometer 140 connected between a source of voltage, for example, negative 24 volts and ground potential, with the movable contact thereof connected to a resistor 141 which is connected to the connection point of resistors 130 and 131. The potentiometer 140 provides a bias adjustment when there is no signal supplied to the input on the terminal 120 of the direct current voltage regulator 49.

The emitter of the transistor 132 is connected to ground potential and the collector thereof is connected to the base of a transistor 142 and also through a resistor 143 to the source of negative potential. A biasing network for the collector of the transistor 132 includes a pair of resistors 144 and 145 connected in series with one another between the source of negative potential and ground potential, with a connection point between such resistors being connected through a diode 146 to the collector of the transistor 132.

The collector of the transistor 142 is connected to a ground potential and the emitter thereof is connected through a diode 147 and a resistor 148 to the source of negative potential. A connection point between the diode 147 and the resistor 148 is connected through resistors 149, 150 and 151 in parallel with one another to respective output terminals. In addition, the connection between the diode 147 and the resistor 148 is connected through a feedback capacitor 152 to the junction of the resistors 130 and 131. The amplifier circuit which is formed by the transistors 132 and 142 with the capacitive feedback provided by the capacitor 152 forms an integrator circuit which integrates the signal supplied thereto and provides a direct current signal at the output which is proportional to the input frequency. The output from the direct current voltage regulator 49 are connected to respective ones of the phase control circuits 71a—f illustrated in FIG. 4.

The phase control circuits 71a—f illustrated in FIG. 4 and the phase control circuits 93a—f illustrated in FIG. 7 are illustrated in FIGS. 10 and 11. The circuit illustrated in FIG. 10 forms an input circuit which is common to two phase control circuits which are connected in common to one another and the lines 34, 35 and 36. For example, the circuit illustrated in FIG. 10 is common to both phase control 71a and 71d. On the other hand, each of the phase control circuits 71a—f and 93a—f include the circuit illustrated in FIG. 11.

The circuit illustrated in FIG. 10, which forms an input circuit for two of the phase control circuits, has an input terminal 160 which is connected through one of the resistors 72a—c (see FIG. 4) and one of the resistors 95a—c (see FIG. 7) to one of the lines 34, 35 and 36, respectively, of the alternating current voltage source. The terminal 160 is connected to the base of a transistor 161 and through a capacitor 162 and a diode 163 in parallel with one another to a ground potential. The emitter of the transistor 161 is also connected to ground. The diode 163 effectively clamps the base of the transistor 161 to ground such that negative excursions of the voltage on the terminal 160 will not alter the base-to-emitter voltage. A source of voltage, for example, positive 24 volts is connected through a resistor 164 to the collector electrode of the transistor 161. A first output terminal 165 is connected to the collector of the transistor 161 and provides an inverted amplified signal corresponding to the voltage developed on the terminal 160. The collector of the transistor 161 is connected through a diode 166 and a resistor 167 in series with one another to the base of a transistor 168. A source of negative potential, for example, negative 24 volts, is connected to the base of the transistor 168 through a resistor 169. The biasing network for the transistor 168 formed of the resistors 164, 167 and 169 maintains the transistor 168 conductive in its quiescent state. On the other hand, the transistor 161 at its quiescent state is rendered nonconductive by virtue of the connection of the emitter electrode thereof through the diode 163 to the base electrode thereof. The emitter of the transistor 168 is connected to ground potential and the collector electrode is connected through a resistor 170 to the source of positive potential. A second output terminal 171 is connected to the collector of the transistor 168 and provides an output thereon which is an inverted amplified signal corresponding to the signal applied at the base of the transistor 168.

As previously mentioned, the input circuit illustrated in FIG. 10 is common to two of the phase control circuits. The output terminal 165 is connected to an input terminal 175 of one of the phase control circuits corresponding thereto and the second output terminal 171 is connected to the input terminal 175 of another corresponding phase control circuit. By virtue of the inversion characteristic of the transistor 168, the outputs on the terminals 165 and 171 will be inverted with respect to one another.

As illustrated in FIG. 11, the input terminal 175 is connected through a diode 176 and a resistor 177 is series with one another to the base of a transistor 178. The base of the transistor 178 is connected through a resistor 179 to the source of negative potential. The emitter of the transistor 178 is connected to ground potential and the collector thereof is connected through a resistor 180 to the source of positive potential and through a resistor 181 to the base of a transistor 182. The base of the transistor 182 is connected through a capacitor 183 to ground potential. The collector of the transistor 182 is connected through a resistor 184 to the source of positive potential. The emitter of the transistor 182 is connected through a potentiometer 185 to a terminal 186.

The terminal 186 of the phase control circuit illustrated in FIG. 11 corresponds to the terminals 73a—f of the phase control circuits 71a—f illustrated in FIG. 4 which are connected to respective outputs of the direct current-to-voltage regulator 49 illustrated in FIG. 9. On the other hand, the terminal 186 corresponds to the terminals 96a—f of the phase control circuits 93a—f illustrated in FIG. 7 which are connected to an output of the current regulator. The connection of the the direct current-to-voltage regulator 49 or the current regulator 53 to the terminal 186 provides a voltage thereon for controlling the operating point of the remaining portions of the circuit.

The movable contact of the potentiometer 185 is connected to the base of a transistor 187 having the emitter electrode thereof connected to ground potential and the collector electrode thereof connected through a resistor 188 to the source of positive potential. The collector of the transistor 187 is connected through a diode 189 and a resistor 190 in series with one another to the base of a transistor 191. The base of the transistor 191 is also connected through a resistor 192 to the source of negative potential. The transistor 191 is connected in parallel with a transistor 192 and together form an OR gate. In particular, the emitters of the transistors 191 and 192 are connected to one another and to ground and the collectors thereof are connected to one another and through a resistor 193 to the source of positive potential. The collector addition, the collectors of the transistors 191 and 192 are connected through a resistor 194 to the base of a transistor 195. The base of the transistor 192 is connected through a resistor 196 to the source of negative potential and through a resistor 197 to a terminal The terminal 198 corresponds to the terminals 74a—f of the phase control circuits 71a—f illustrated in FIG. 4 and to the terminals of the phase control circuits 93a—f illustrated in FIG. 7. A source of voltage at frequency $F_2$ is supplied to terminal 198 and effectively modulates the signal by means of the transistor 192 which is supplied by the transistor 191 to the base of the transistor 195. The base of the transistor 195 is connected through a resistor 199 to the source of negative potential. The emitter of the transistor 195 is connected to ground and the collector thereof is connected through a resistor 200 to the source of positive potential. In addition, the collector of the transistor 195 is connected through a diode 201 to a source of positive potential, for example, positive 5 volts. Furthermore, the collector of the transistor 195 is connected through a capacitor 202 to a first output terminal 203. The emitter of the transistor 195 is connected to a second output terminal 204.

The operation of the circuit illustrated in FIG. 11 depends upon which one of the terminals 165 or 171 is connected to the input terminal 175. Consequently, the operation of the circuit illustrated in FIG. 11 will be explained first in connection with one input from the terminal 165 being supplied thereto and then in connection with the other input from the terminal 171 being supplied to the input thereof.

With the terminal 165 being connected to the terminal 175, and since the transistor 161 is normally rendered nonconductive, the transistor 178 will be rendered conductive by virtue of the biasing network formed by resistors 164, 177 and 179.

With the transistor 178 being normally conductive, the capacitor 183 will be discharged therethrough and the base of the transistor 182 will be effectively a ground potential resulting in the nonconduction of the transistor 182.

The voltage supply to the terminal 186 will be a negative voltage which is effectively mixed with the voltage on the emitter of the transistor 182 in the resistor 185 and supplied to the base of the transistor 187. Because of the relative nonconduction of the transistor 182, the emitter voltage thereof will be substantially at ground potential. Consequently, in its quiescent state, the transistor 187 will be nonconductive. The biasing network formed of resistors 188, 190 and 192 will render the transistor 191 conductive. The connection of the base of the transistor 192 through the resistor 196 to the negative supply voltage, in the absence of a signal supplied to the terminal 198, renders the transistor 192 nonconductive. Because of the conduction of the transistor 191 and the biasing arrangement provided by resistors 193, 194 and 199, the transistor 195 will be normally nonconductive. However, because of the capacitor 202 connected between the collector of the transistor 195 and the output terminal 203, no output signal will be provided thereon.

When the voltage level on the terminal 160 becomes positive, the transistor 161 will be rendered conductive, thus reducing the voltage level on the output terminal 165. With the terminal 165 connected to the terminal 175, such reduction in voltage thereon will render the transistor 178 nonconductive. As a result, the capacitor 183 will begin to charge through the resistors 180 and 181. When the voltage developed on the capacitor 183 exceeds the emitter voltage of the transistor 182, the transistor will become fully conductive. Consequently, the transistor 187 will become conductive by virtue of the increase of voltage on the base electrode thereof. The conduction of the transistor 187 reduces the voltage on the collector electrode thereof, which in turn reduces the voltage on the base of the transistor 191. Such reduction in voltage causes the transistor 191 to become nonconductive. When a signal $F_2$ of relatively high frequency, for example, 1 megahertz is supplied to the terminal 198, such a signal will be amplified by the transistor 192 and supplied to the base of the transistor 195 if and only if the transistor 191 is nonconductive. As a result, the signal supplied to the terminal 198 and amplified by the transistor 192 controls the conduction level of the transistor 195 to produce a signal which will be coupled through the capacitor 202 to the output terminal 203.

The static as well as the dynamic operation of the circuit illustrated in FIG. 11 is completely altered when the terminal 171 of the circuit illustrated in FIG. 10 is connected to the terminal 175. Under static conditions, the connection of the terminal 171 to the terminal 175 maintains the transistor 178 nonconductive permitting the capacitor 183 to charge to a level of the positive supply voltage. As a result of the charge on the capacitor 183, the transistor 182 is rendered conductive. Such conduction of the transistor 182 under static conditions of the circuit results in the bias supplied to the transistor 187 being sufficient to render the transistor conductive. Such conduction of the transistor 187 reduces the collector voltage thereof causing the transistor 191 to be rendered nonconductive.

With the transistors 191 and 192 being rendered nonconductive under static conditions, the transistor 195 is rendered conductive. The signal $F_2$ supplied to the terminal 198 will be amplified by the transistor 191 and supplied to the base of the transistor 195 to provide an output through the capacitor 202 to the output terminal 203. Therefore, under static conditions of the circuits illustrated in FIGS. 10 and 11, when the terminal 171 is connected to the terminal 175, an output signal at the frequency $F_2$ will appear at the terminal 203. When the voltage on the terminal 160 of the circuit illustrated in FIG. 10 becomes positive, the transistor 161 will be rendered conductive and the transistor 168 will be rendered nonconductive to provide a positive biasing voltage to the base of the transistor 178. Consequently, the transistor 178 will become conductive, causing the capacitor 183 to discharge therethrough resulting in the transistor 182 becoming relatively nonconductive. As a result of the reduction in the conduction level of the transistor 182, the biasing voltage supplied to the transistor 187 will become negative causing the transistor 187 to become nonconductive. Such nonconduction of the transistor 187 will increase the biasing voltage supplied to the transistor 191, thus resulting in the transistor 191 becoming conductive. Conduction of the transistor 191 reduces the voltage on the base of the transistor 195 resulting in that transistor becoming nonconductive. The signal $F_2$ which is amplified by the transistor 192 will be effectively shorted to ground and with the transistor 195 being nonconductive, no output will appear on the terminal 203.

From the above description of the static and dynamic operating characteristics of the circuits illustrated in FIGS. 10 and 11, it can be appreciated that an output signal will appear at the terminal 203 when the terminal 171 is connected to the terminal 175 and when the voltage on the terminal 160 is not sufficiently positive to render the transistor 161 conductive. It can also be appreciated that an output signal will appear on the terminal 203 if the terminal 165 is connected to the terminal 175 and the voltage on the terminal 160 is sufficiently positive to render the transistor 161 conductive. The point at which the output will appear on the terminal 203 in relation to the phase of the voltage on the terminal 160 will be determined by the setting of the movable contact of the potentiometer 185 and the value of the voltage supplied to the terminal 186 from either the direct current-to-voltage regulator 49 or the current regulator 53.

As previously mentioned, the phase control circuits 71a and 71d share with one another the circuit illustrated in FIG. 10 and each include a circuit such as that illustrated in FIG. 11. The commonly connected phase control circuits 71b and 71e and the commonly connected phase control circuits 71c and 71f also share circuits such as that illustrated in FIG. 10 and each include a circuit such as that illustrated in FIG. 11. The commonly connected phase control circuits of FIG. 7 are formed in the same manner. Therefore, if the voltage on the line 34 for instance, is positive with respect to the voltage on the lines 35 and 36, the phase control 71a, 71e and 71f provide outputs to the corresponding SCR gate control circuits 68a, 68e and 68f respectively while the remaining phase control circuits 71b, 71c and 71d will not provide an output to the corresponding SCR gate control circuits 68b, 68c and 68d, respectively, It should be remembered, however, that although an output is provided by a particular phase control circuit 71a—f, the corresponding silicon-control rectifiers 65a—f may not be rendered conductive, since the cathode potential thereof may be higher than the anode potential. In other words, not only must the particular SCR have a positive bias applied to the gate electrode thereof, but the anode voltage must be greater than the cathode voltage in order for such SCR to become conductive.

One of the problems associated with systems which employ silicon control rectifiers to control the application of large voltages is that of energizing the control rectifiers so that a definite and positive switching action occurs. In order to provide good switching conditions for the silicon control rectifiers in the inverter bridge circuit 43, the rectifier circuit 33 and the generator circuit 52, a relatively high-power trigger pulse must be developed over a predetermined time period in order to saturate the control rectifiers within the shortest time possible. If this requirement is not met, it is possible that the controlled rectifiers may cause transients or other spurious voltages which are not desired in the system. Furthermore, if relatively large currents are being handled by the controlled rectifiers, it is possible to destroy the devices if proper switching voltages and currents are not realized. The SCR gate control circuits 68 illustrated in FIG. 4 and 80 illustrated in FIG. 5, and 92 illustrated in FIG. 7 provide a high-power pulse to the respective rectifiers connected thereto so that proper switching action occurs.

FIG. 12 illustrates a schematic diagram of the SCR gate control circuits 68 in FIG. 4 and the SCR gate control circuits 92 in FIG. 7. The SCR gate control circuits 80 illustrated in FIG. 5 are formed of the circuit illustrated in FIG. 12 as well as the circuit illustrated in FIG. 13.

Figure 13:
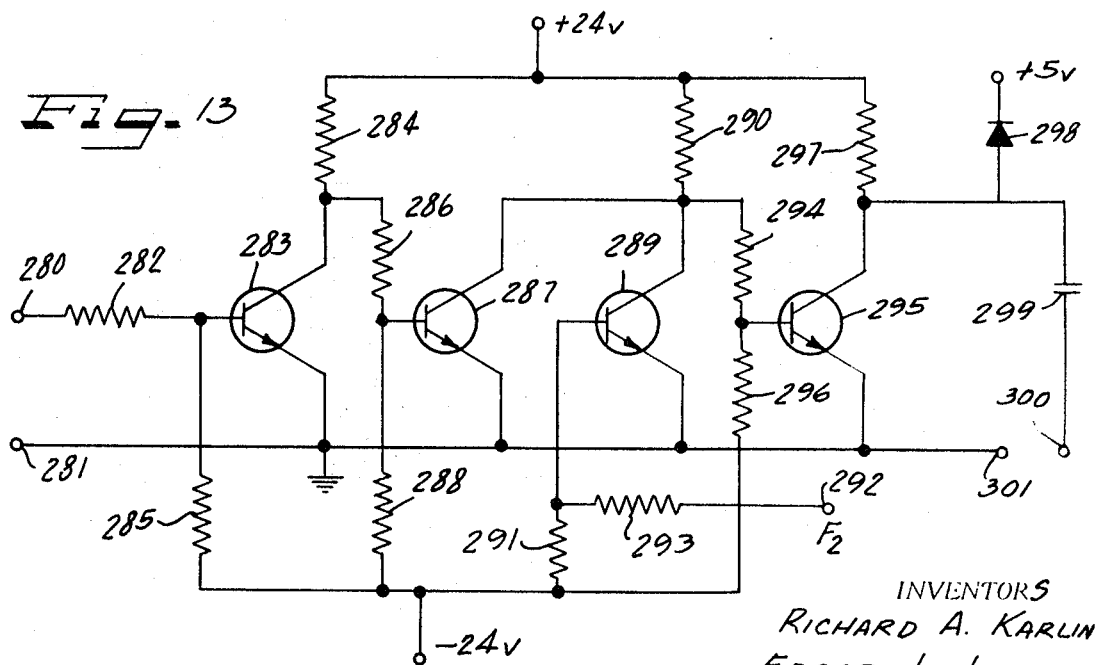
FIG. 13 is a schematic diagram of a control circuit employed in conjunction with the SCR gate control circuit of FIG. 12 to control the inverter bridge circuit of FIG. 5.

The SCR gate control circuit illustrated in FIG. 12 is provided with an input on the terminals 210 and 211 which is obtained either from the output of the circuit illustrated in FIG. 11 on the terminals 203 and 204 or from an output of the circuit illustrated in FIG. 13. A feedback signal is provided as another input to the SCR gate control circuit illustrated in FIG. 12 on the terminal 212. An output is developed by the SCR gate control circuit illustrated in FIG. 12 on the terminals 213 and 214. The output terminal 213 is connected to the gate electrode of a silicon-controlled rectifier 215 and the output 214 is connected to the cathode of the silicon-controlled rectifier 215. The silicon-controlled rectifier 215 controls the flow of current between a pair of terminals 216 to 217. A diode 218 is connected in series with the SCR 215 between the terminals 216 and 217. A resistor 219 is connected in parallel with the diode 218 and a resistor 220 is connected in parallel with the SCR 215. The voltage on the terminal 216 is supplied as a feedback signal to the SCR gate control circuit via the terminal 212 thereof by means of a resistor 221.

The silicon-controlled rectifier 215 illustrated in FIG. 12 corresponds to the silicon-controlled rectifiers 65a—f illustrated in FIG. 4, the silicon-controlled rectifiers 77a—f illustrated in FIG. 5, and the silicon-controlled rectifiers 89a—f illustrated in FIG. 7. Since the SCR 215 corresponds to one of the SCR's 65a—f, the terminal 216 corresponds to one of the lines 34—36, respectively, and the terminal 217 corresponds to the line 37. If the SCR 215 corresponds to one of the SCR's 65d—f, the terminal 216 corresponds to the line 38 and the terminal 217 corresponds to one of the lines 34—36, respectively. Similarly, the resistor 221 corresponds to one of the resistors 70 illustrated in FIG. 4. This correspondence between the elements illustrated in FIG. 12 and the elements illustrated in FIG. 4 demonstrates a similar correspondence with the elements illustrated in FIGS. 5 and 7.

When the silicon-controlled rectifier 215 is to be turned on to permit the flow of current between the terminals 216 and 217, a signal is supplied to the terminals 210 and 211. From the above description of FIG. 11, the signal supplied to the input of the circuit illustrated in FIG. 12 constitutes a plurality of cycles of a signal at a frequency $F_2$, for example, one megahertz. The alternating signal supplied to the terminals 210 and 211 is developed across the primary winding of a transformer 225 and is coupled to the secondary winding thereof. The secondary winding of the transformer 225 is connected to the input of a full wave bridge rectifier circuit 226. An output of the full wave bridge rectifier circuit 226 is connected across an integrator circuit formed of a resistor 227 and a capacitor 228. This arrangement provides a charge on the capacitor 228 which gradually increases with the time elapsed from the beginning of the application of the input signal to the input terminals 210 and 211. The positive plate of the capacitor 228 is connected through a resistor 229 to one input of an AND gate 230. Another input to the AND gate 230 is supplied from the terminal 212 which senses the voltage level on the anode of the SCR 215. This feedback signal is supplied to the AND gate 230 through a diode 231. An output of the AND gate 230 is supplied to the input of a monostable multivibrator 232 which provides an output pulse at an output thereof relatively small time duration. An output of the monostable multivibrator 232 is connected to a driver stage 233 which provides a well-defined square wave at an output thereof having the same time duration as the time duration of the output of the monostable multivibrator 232. The output of the driver stage 233 is supplied to a power stage 234 which produces a pulse at the output thereof relatively large power and having a well-defined square wave shape. The output of the power stage is developed across the terminals 213 and 114 which are connected between the cathode and the gate electrodes of the silicon-controlled rectifier 215 to provide definite switching action therein.

The AND gate 230 is formed of a pair of transistors 240 and 241 which are connected in series with one another. In particular, a source of positive voltage, for example, positive 20 volts, is connected through a resistor 242 to the collector electrode of the transistor 240. The emitter of the transistor 240 is connected to the collector of the transistor 241 and the emitter of the transistor 241 is connected to ground potential. In the quiescent state of the SCR gate control circuit illustrated in FIG. 12, the transistors 240 and 241 are rendered nonconductive by virtue of the direct current bias supplied to each. In particular, the base of the transistor 240 is connected through a resistor 243 to a source of negative potential, for example, negative 20 volts. In addition, the base of the transistor 241 is connected to the source of negative potential through a resistor 244. In addition, the base of the transistor 241 is clamped to ground potential by means of a diode 245, such that only positive signals may be supplied thereto. The base of the transistor 240 forms one input of the AND gate 230 and is connected to the resistor 229 and the base of the transistor 241 forms the other input of the AND gate 230 and is connected to the diode 231. An output of the AND gate 230 developed on the collector of the transistor 240 and is connected through a diode 246 to the base of a transistor 247 which forms the input of the monostable multivibrator 232.

In the quiescent state of operation before an input signal is supplied to the terminals 210 and 211, the transistor 247 is rendered conductive by virtue of the direct current bias circuit connected to the base thereof. This direct current bias circuit includes the resistor 242 connected between the source of positive voltage and the base electrode of the transistor 247 and a resistor 248 connected between the base of the transistor 247 and the source of negative potential.

The collector of the transistor 247 is connected through a resistor 249 to the source of positive potential and the emitter electrode thereof is connected to ground potential. The collector of the transistor 247 is connected through a resistor 250 to the base of the transistor 251 which is in turn connected through a resistor 252 to the source of negative potential. The resistors 249, 250 and 252 form a direct current biasing circuit for the transistor 251 which renders it nonconductive in the quiescent state of operation. The emitter of the transistor 251 is connected to ground potential and the collector thereof is connected through a resistor 253 to the source of position potential. The collector of the transistor 260 is also connected through a capacitor 254 and a resistor 255 to the base of a transistor 256. The base of the transistor 256 is also connected through a resistor 257 to the source of positive potential. The collector of transistor 256 is connected through a resistor 258 to the source of positive potential and the emitter thereof is connected to ground potential. In the quiescent state of operation the transistor 256 is rendered conductive by virtue of the connection of the positive source of voltage through the resistor 257 to the base thereof.

The collector of the transistor 256 is connected through a resistor 259 to the base of a transistor 260 which is in turn connected through a resistor 261 to the source of a negative potential. The resistors 258, 259 and 261 form a direct current biasing circuit for the base of the transistor 260 which renders the transistor 260 in the quiescent state of operation nonconductive. The transistor 260 is connected in parallel with the transistor 251 and in parallel with a resistor 262. The collector of the transistor 256 is also connected through a resistor 263 to the base of a transistor 264 which is in turn connected through a resistor 265 to the source of negative potential. The resistors 258, 263 and 265 form a direct current to biasing the circuit for the base of the transistor 264 which renders the transistor 264 nonconductive in the quiescent state of operation.

The emitter of the transistor 264 is connected to ground potential and the collector thereof is connected through a pair of resistors 266 and 267 in series with one another to the source of positive potential. The connection point between the resistors 266 and 267 is connected to the base of the transistor 268 in the driver circuit 233. In the quiescent state of operation, because of the nonconduction of the transistor 264 and the connection of the base of the transistor 268 through the resistor 267 to the source of positive potential, the transistor 268 will be rendered nonconductive. The emitter of the transistor 268 is connected through a resistor 269 to the source of positive potential and through a capacitor 270 to ground potential. In addition, the collector of the transistor 268 is connected through a resistor 271 to the source of negative potential. The collector of the transistor 268 is also connected to the base of a transistor 272 in the power stage 234. In the quiescent state of operation, because of the nonconduction of the transistor 268 and the connection of the base of the transistor 272 through the resistor 271 to the source of negative potential, the transistor 272 will be rendered nonconductive. The collector of the transistor 272 is connected through a resistor 273 to the source of positive potential and through a capacitor 274 to ground potential. The emitter of the transistor 272 is connected through a diode 275 to the base thereof and through a resistor 276 to the terminal 213. The terminal 213 is connected through a resistor 277 and a capacitor 278 in parallel with the terminal 214 which is at ground potential. In addition, the terminal 213 is connected through a resistor 279 to the source of negative potential. Because of the nonconduction of the transistor 272, and by virtue of the connection of the gate electrode of the SCR 215 through the resistor 279 to the source of negative potential, and the cathode of the SCR 215 to the ground potential, the SCR 215 will be biased with a negative voltage which will not effect the triggering thereof. However, if the transistor 272 is rendered conductive, current will flow therethrough and through the resistors 276 and 277 to develop a voltage drop across them. The voltage drop on the resistor 277 across the terminals 213 and 214 will be effective to trigger the SCR 215 to permit conduction of current from terminal 216 to terminal 217.

As discussed above in connection with the description of FIGS. 4, 5 and 7, a source of voltage at a predetermined frequency $F_1$, for example, 125 kilohertz is connected to the SCR gate control circuits 68a—f, 80a—f and 92a—f. This source of voltage is connected through a rectifier and a filter circuit (not shown) to provide the positive and negative voltage sources for the circuit illustrated in FIG. 12. Consequently, each SCR gate control circuit is provided with its own voltage source so that it will be completely isolated from the remaining circuitry to eliminate the possibility of false triggering of the SCR's. Depending upon where the SCR gate control circuit illustrated in FIG. 12 is employed, (see FIG. 4, FIG. 5 or FIG. 7), the terminal 216, for example, may correspond to any one of the lines 34, 35, 36, 38, 40, 44, 45, 46 or 75. Similarly, the terminal 217 may correspond to any one of the lines 34, 35, 36, 37, 41, 44, 45 or 46. Therefore, because of the separate source of voltage provided for the SCR gate control circuits illustrated in FIG. 12, the positive and negative sources of voltage supplied thereto will remain constant with respect to terminal 214 which was referred to above as being connected to ground potential. This condition can be considered as maintaining the terminal 214 at a "floating" potential and the positive and negative sources of voltage constant with respect thereto. Because of this "floating" condition false triggering of the SCR 215 will not result.

In operation, when a signal is supplied to the input of the circuit illustrated in FIG. 12 on the terminals 210 and 211, the full wave bridge rectifier circuit 226 will convert such signals to a continuous train of positive pulses. These positive pulses will be supplied through the resistor 227 to the capacitor 228, causing the capacitor 228 to gradually charge until the transistor 240 is rendered conductive. However, because of nonconduction of the transistor 241, no signal will be supplied to the monostable multivibrator 232. The transistor 241 is rendered conductive only when the voltage on the terminal 216 becomes positive with respect to the voltage on the terminal 217. This condition causes current flow through the resistor 221 into the base of the transistor 241 to render the transistor 241 conductive. When both of the transistors 240 and 241 are conductive, the transistor 247 becomes less conductive by virtue of the drop in voltage at the base thereof.

The reduced conduction through the transistor 247 increases with the voltage on the base of the transistor 251 which renders that transistor conductive. Before the transistor 251 is rendered conductive, however, the capacitor 254 is charged to a predetermined value. The charge on the capacitor 254 is determined during the quiescent state of operation by voltage divider circuit consisting of the resistor 253 and the resistor 262 connected between the source of positive voltage and ground potential. The capacitor 254 charges through the base to emitter circuit of the transistor 256. When the transistor 251 becomes conductive, however, the capacitor 254 discharges producing a negative pulse of voltage on the base of the transistor 256 which renders that transistor nonconductive during the time period which the capacitor 254 discharges to a predetermined level. The transistor 256 is then again rendered conductive by virtue of the connection of the base thereof through the resistor 257 to the source of positive potential.

When the transistor 256 becomes nonconductive, the voltage on the base of the transistor 260 increases causing that transistor to become conductive. Conduction of the transistor 260 provides an alternate path for the discharge of the capacitor 254. This alternate path for the discharge of the capacitor 254 is provided in the event that the transistor is rendered nonconductive before the capacitor 254 has discharged to the predetermined level. The transistor 251 can be rendered nonconductive if neither one of the input supplies to the AND gate 230 is removed. This condition is likely to occur when the transistor 240 is rendered conductive and the capacitor 228 discharges through the base to emitter circuit thereof.

When the transistor 256 is rendered conductive, the potential at the base of transistor 264 is increased causing that transistor to become conductive. Conduction of transistor 264 reduces the voltage on the base of the transistor 268 causing that transistor to become conductive.

In the quiescent state of operation, the capacitor 270 is charged through the resistor 269. When the transistor 268 is rendered conductive, the voltage on the base of the transistor 272 rises abruptly due to the discharge of the capacitor 270 through the transistor 268. In the quiescent state of operation, the capacitor 274 charge through the resistor 273. The time constant determined by the resistance value of the resistor 273 and the capacitance value of the capacitor 274 is relatively small in comparison to one cycle of either the alternating current voltage supplied to the lines 34, 35 and 36 or one cycle of the alternating current voltage produced on the lines 44, 45 and 46. Consequently, the voltage developed on the capacitor 274 is approximately equal to the value of the positive supply voltage. When the transistor 272 is rendered conductive, the capacitor 274 discharges therethrough resulting in the conduction of a high current pulse through the resistors 276 and 277. Therefore, the capacitor 274 can be considered a "booster" capacitor for producing a high current pulse on the gate of the silicon-controlled rectifier 215. This After the transistor 256 has been rendered nonconductive by the application of a negative pulse of voltage to the base thereof by virtue of the discharge of the capacitor 254, it will become conductive again when the capacitor 254 has discharged to a predetermined level. When the transistor 256 is rendered conductive, the voltage at the collector electrode thereof decreases causing the voltage on the base electrodes of the transistors 260 and 264 to also decrease rendering those transistors nonconductive. If for some reason the transistor 251 continues to be conductive after a pulse is supplied from the monostable multivibrator 232, the transistor 256 will not be rendered nonconductive in consequence thereof, since the capacitor 254 has not had an opportunity to charge as in the quiescent state of operation. This condition will not, however, result in any detrimental operation of the circuit, since the SCR 215 will continue to conduct in the absence of a triggering pulse at the gate electrode thereof as long as the voltage at the anode thereof is more positive than the voltage at the cathode thereof. As soon as the voltage at the anode of the SCr 215 falls below the voltage on the cathode thereof, one input to the AND gate 230 supplied through the resistor 221 will be removed causing the transistor 241 to become nonconductive. With such nonconduction of the transistor 241, the transistor 247 will become conductive resulting in the bias supplied to the transistor 251 to decrease rendering the transistor 251 nonconductive.

When the transistor 264 is rendered nonconductive, the transistor 268 will be rendered nonconductive, which will in turn render the transistor 272 nonconductive. It can be appreciated, therefore, that the monostable multivibrator 232 will deliver a pulse at an output thereof having a fixed time duration dependent upon the discharge of the capacitor 254. Once a trigger pulse is supplied to the monostable multivibrator 232, the circuit will provide an output pulse which will always have the same time duration regardless of the time duration of the pulse supplied to the input thereof.

As previously mentioned, each of the SCR gate control circuits 80a—f illustrated in FIG. 5 are formed of the circuits illustrated in FIGS. 12 and 13 connected in series with one another. Each of the SCR gate control circuits 80a—f is connected to a respective output of the polyphase frequency source 47 (see FIG. 2). The respective output of the polyphase frequency source 47 are illustrated in FIG. 6 with three of the outputs constituting the positive portions of the signals 84, 85 and 86 and the remaining three output signals constituting the negative portions of the signals 84, 85 and 86. A respective one of these outputs is supplied as an input to a respective one of the circuits illustrated in FIG. 13 on the terminals 280 and 281 thereof.

The terminal 280 is connected through a resistor 282 to the base of a transistor 283 having the emitter thereof connected to the terminal 281 which is at ground potential. The collector of the transistor 283 is connected through a resistor 284 to a source of positive potential, for example, positive 24 volts. The base of the transistor 283 is also connected through a resistor 285 to a source of negative potential, for example, negative 24 volts. The connection of the base of the transistor 283 to the negative supply voltage normally renders the transistor 283 nonconductive in the absence of a signal supplied to the input terminals 280 and 281.

The collector of the transistor 283 is connected through a resistor 286 to the base of a transistor 287 which is in turn connected through a resistor 288 to the negative supply voltage. The biasing network formed of the resistors 284, 286 and 288 normally renders the transistor 287 conductive when the transistor 283 is nonconductive. The collector and emitter electrodes of the transistor 287 are connected to the collector and emitter electrodes respectively of a transistor 289. The collectors of the transistors 287 and 289 are connected through a resistor 290 to the source of positive potential and the collectors thereof are connected to ground potential. The base of the transistor 289 is connected through a resistor 291 to the source of negative potential, which in the absence of any other signal being supplied, renders the transistor 289 normally nonconductive. A signal at a frequency $F_2$ is supplied to a terminal 292 which is connected through a resistor 293 to the base of the transistor 289. The transistor 289 amplifies the signal supplied to the terminal 292 and supplies such amplified signal as an output therefrom its collector electrode.

The transistors 287 and 289 from an OR gate so that with conduction of transistor 287, the collectors of the transistors 287 and 289 are effectively grounded.

The collector of the transistor 289 is connected through a resistor 294 to the base of a transistor 295, which is in turn connected through a resistor 296 to the source of negative potential. The biasing arrangement formed of resistors 290, 294 and 296 normally renders the transistor 295 conductive. However, because of the conduction of the transistor 287 in the quiescent state of operation, the transistor 295 is rendered nonconductive. The collector of the transistor 295 is connected through a resistor 297 to the source of positive potential and through a diode 298 to a second source of positive potential of, for example, positive 5 volts. The collector of the transistor 295 is also connected through a capacitor 299 to an output terminal 300. The emitter of the transistor 295 is connected to ground potential and to a second output terminal 301.

When a signal is supplied to the input terminals 280 and 281, the transistor 283 is rendered conductive to lower the potential at the collector thereof which in turn lowers the potential at the base of the transistor 287. This reduction in the voltage at the base of the transistor 287 renders the transistor 287 nonconductive causing the voltage at the collector thereof to increase. The signal supplied at the terminal 292 which is amplified by the transistor 289 is effectively impressed on the increased voltage level at the collector thereof and supplied through the resistor 294 to the base of the transistor 295. With the nonconduction of the transistor 287 and the increase of voltage at the collector thereof, the transistor 295 is The signal conductive. The signal which is supplied to the base of the transistor 295 from the collector of the transistor 289 is amplified and such amplified signal is developed at the collector electrode.

The diode 298 effectively clamps the voltage at the collector of the transistor 295 to a positive 5 volts such that the voltage at the collector of the transistor 295 cannot exceed such voltage. The amplified signal at the collector of the transistor 295 is coupled through the capacitor 299 to the output terminal 300. The output terminals 300 and 301 are connected to the terminals 210 and 211 of a respective one of the SCR gate control circuits illustrated in FIG. 12.

As discussed above with respect to the description of the block diagram illustrated in FIG. 3, two methods are available for accomplishing digital division of the output frequency of a fixed frequency oscillator. One of those methods employs a standard divider circuit which produces one output pulse upon the delivery of a predetermined number of input pulses thereto. Such a frequency divider provides a high degree of resolution only at the upper range of the division operation produced thereby. For example, if such a standard divider is adjusted to provide one output pulse for every input pulse, the next discrete change which can be produced therein would result in the divider providing one output pulse for every two input pulses. Such a change results in the division being altered by a factor of two. Therefore, such a standard divider circuit achieves a high resolution only at the upper range thereof. Consequently, if such a standard divider is employed, the frequency of the signal supplied to the input thereof must be higher by a factor of 3 or 4 than the frequency of the output from the divider.

However, if a pulse chopper is employed as a divider which eliminates one pulse from a number of pulses supplied to the input thereof, a different condition exists. That is, high resolution is obtained at the lower end of the scale of such a divider. In particular, it can be realized when the pulse chopper removes one pulse from a series of pulses, a change to the next setting thereof would provide the removal of two output pulses from the same series, although such removed pulses may be spaced from one another. In the standard divider circuit, such a change results in a change in the output by a factor of two. In the pulse chopper, however, the same change results in a relatively small percentage change in the output. Therefore, the signal supplied at the input of a divider circuit which employs a pulse chopper need only be as great as the maximum output frequency desired from the output of the divider circuit.

Such a pulse chopper circuit employed as a frequency divider constitutes the second method for accomplishing digital division of the output frequency of a fixed frequency oscillator. A pulse chopper divider circuit contemplated by the present invention is illustrated in FIG. 14 and may be employed as the variable frequency oscillator 55 illustrated in FIG. 3. As shown in FIG. 14, a fixed frequency oscillator 310, which may be, for example, a crystal oscillator, is connected to a counter circuit 311 which is preset to count to a predetermined full-scale number M. A group of gates 312 are connected to the counter and are preset at a predetermined number N. An output of the counter 311 is connected to the "set" input of a binary 313 and the output of the gate 312 is connected to the "reset" input of the binary 313. The "set" output of the binary 313 is connected to one terminal of AND gate 314 having the other input thereof connected to the output of the fixed frequency oscillator 310. The output of the AND gate 314 forms the "master clock" signal which is supplied directly to the "runup" speed control circuit 47 illustrated in FIG. 3.

In operation, assuming that the binary stage 313 is initially "set," all of the pulses initially supplied by the fixed frequency oscillator 310 will be passed by the gate 314 to the input terminal thereof. As pulses are supplied to the input of the counter 311 from the oscillator 310, and counter 311 will count up to the number N which is preset into the gate 312, at which time an output will be delivered from the gate 312 to the "reset" of the binary 313 causing the binary 313 to reset, thereby eliminating one input to the AND gate 314 which will cause the output of the oscillator 310 to be blocked. When the counter 311 has attained its full count M the binary 313 will be "set" to enable the AND gate 314 to permit the flow of pulses from the oscillator 310 therethrough. Therefore, the "master clock" output from the AND gate 314 will constitute a number of pulses equal to the number M LESS THE NUMBER N.

The "runup" speed control circuits 57 permit the respective motors 48 connected thereto to be gradually increased from a standstill to operating speed while maintaining synchronous operation. In processing machines which are generally formed of a plurality of separate stations, each interconnected with one another to produce a unitary result, it is often desirable to discontinue the operation of one of the stations while maintaining the other stations operative. In addition, it is also desirable that such a processing machine have the capability of initiating or starting a particular station at a relatively slow speed and gradually increasing that speed until it matches the speed of the other stations in the entire machine. If synchronous motors are employed, it is also desirable to start such motors at a slot speed while in synchronism and to maintain the synchronous operation during the increase of the speed to operating speed. This function is provided in the present invention by the "run-up" speed control circuits 57 which are illustrated in block diagram form in FIG. 15.

As shown in FIG. 15, the output of the master oscillator 55 is connected to one input of an AND gate 320 and to the "reset" input of a clock control flip-flop circuit 321. An output of a multivibrator circuit 322 is connected to the "set" input of the flip-flop 321. An output of the flip-flop 321 is connected to the second input of the AND gate 320 through a switch contact 323. The multivibrator 322 and the switch 323 are controlled by a frequency control unit 324 which is preferably formed of a potentiometer connected to the multivibrator 322 to control the frequency output thereof and to the switch 323 to actuate the switch 323 at one end of travel of the potentiometer.

The clock control flip-flop 321 is "set" each time the multivibrator produces a pulse at the output thereof and is "reset" each time the master oscillator 55 produces a pulse at the output thereof. When the flip-flop 321 is "set," the gate 320 is blocked and the pulses from the master oscillator 55 cannot pass therethrough.

At the beginning of the startup period, the frequency control 324 is adjusted to the maximum frequency position thereof. This frequency is approximately twice the maximum frequency obtained from the master oscillator 55. Under these conditions, the flip-flop circuit 321 receives twice as many "set" pulses as "reset" pulses and the gate 320 is blocked almost continuously. As the frequency control 324 is altered, the frequency of the multivibrator 322 decreases and the flip-flop 321 receives fewer "set" pulses. As a result, the flip-flop 321 is "reset" a greater number of times, and the gate 320 is enabled during those times to allow the passage of pulses from the master oscillator 55 therethrough. When the frequency control 324 is completely extended to the upper limit thereof, the switch 323 is actuated and a constant voltage is applied to the second input of the "and" gate 320 to permit the passage of all of the pulses from the master oscillator 55 to pass therethrough. Consequently, the output of the gate 320 will be equal in frequency to the frequency of the output of the master oscillator 55.

A schematic diagram of the multivibrator 322 is illustrated in FIG. 16. A potentiometer 330 which forms the frequency control 324 is connected between a source of positive voltage and the base of a transistor 331. The collector of the transistor 331 is connected through a resistor 332 to a source of positive voltage and through a capacitor 333 to ground potential. The emitter of the transistor 331 is connected through a resistor 334 to a source of negative voltage and is also connected directly to the base of a transistor 335. The collector of the transistor 335 is connected through a resistor 336 to the source of positive voltage and though a resistor 337 to ground potential. The collector of the transistor 335 is also connected through a resistor 338 to the base of a transistor 339. The base of the transistor 339 is connected through a resistor 340 to the source of negative potential and the collector thereof is connected through a resistor 341 to the source of positive potential nd to an output terminal 342 of the multivibrator circuit. The collector of the transistor 339 is also connected through a resistor 343 to ground potential which forms a voltage divider circuit with the resistor 341 to establish a voltage level at terminal 342 when transistor 339 is not conductive. The emitter of the transistor 339 is connected to ground potential. The collector of the transistor 335 is also connected through a capacitor 344 to the base of a transistor 345 which is in turn connected through a potentiometer 346 to the source of positive potential. The collector of the transistor 345 is connected through a resistor 347 to the source of positive potential and the emitter thereof is connected to a resistor 348 to the source of negative potential and is also connected directly to the base of a transistor 349. The collector of the transistor 345 is also connected through a capacitor 350 to ground potential. The emitter of the transistor 349 is connected to ground potential and the collector there of is connected through a resistor 351 to the source of positive potential. In addition, the collector of the transistor 349 is connected through a resistor 352 to ground potential and through a capacitor 353 to the base of the transistor 331. The respective values of the resistors 337 and 352 determine which one of the transistors 331 and 345 will be initially conductive. In the preferred embodiment of the present invention, the transistor 345 will be initially conductive. Such conduction of the transistor 345, by virtue of the connection of the emitter thereof to the base of the transistor 349, will render the transistor 349 conductive. Since the transistor 331 is initially nonconductive, the transistor 335 will also be rendered nonconductive by virtue of the connection of the base thereof through the resistor 334 to the source of negative potential. As a result of the nonconduction of the transistor 335, the voltage on the base of the transistor 339 will be at a level which will render the transistor 339 conductive such that the voltage on the output terminal 342 will be approximately equal to ground potential.

Because of conduction of transistor 345, the capacitor 344 will charge through the base to emitter circuit thereof which will tend to reduce the voltage on the base of the transistor 345 to a point which is close to the region of nonconduction. Because of the conduction of the transistor 349, the capacitor 353 will charge causing the voltage on the base of the transistor 331 to become more positive. This action is accumulative to the point at which the transistor 331 becomes conductive and the transistor 345 becomes nonconductive. The charge time on the capacitor 353 is determined by the setting of the potentiometer 330.

With the conduction of the transistor 331, the voltage on the base of the transistor 335 increases to cause the transistor 335 to become conductive. As a result, the voltage on the base of the transistor 339 is reduced causing that transistor to become nonconductive which results in an increase in the voltage on the output terminal 342. The nonconduction of the transistor 345 results in a decrease in the voltage on the base of the transistor 349 causing that transistor to become nonconductive. Since the multivibrator circuit is symmetrical, the operation will become repetitive such that a series of pulses will be produced at the output terminal 342, the frequency of which is determined by the setting of the potentiometer 330. The capacitors 333 and 350 also assist in causing one of the transistors 331 and 345 to be nonconductive by virtue of the charge developed thereon during the conduction of one of the transistors 331 and 345, which charge results in the collector electrodes of those transistors becoming more negative.

A schematic diagram of the clock control flip-flop circuit 321 is illustrated in FIG. 17. A first input 360 is connected to an output of the master oscillator 55 and a second input 361 is connected to an output of the run-up multivibrator 322. An output is delivered from the flip-flop 321 on a terminal 362 which is connected through the switch contact 323 to the AND 320. The input terminal 360 is connected through a capacitor 363 to the cathode of a diode 364 which has the anode thereof connected to the base of a transistor 365. The emitter of the transistor 365 is connected to ground potential and the collector thereof is connected through a resistor 366 to a source of positive potential. The cathode of the diode 364 is connected through a resistor 367 to ground potential and through a resistor 368 form a voltage divider circuit for establishing a bias for the cathode of the diode 364. The base of the transistor 365 is connected a pair of resistors 370 and 371 connected in series with one another to a source of positive potential. A capacitor 372 is connected in parallel with the resistor 370. A resistor 373 is connected from the connection point of the resistors 370 and 371 to the base of a transistor 375 to the source of the negative potential and the emitter thereof is connected to ground potential. The collector of the transistor 374 is connected through a resistor 377 to ground potential, and to the terminal 362. The collector of the transistor 365 is connected through a resistor 378 to ground potential and through a resistor 379 and a capacitor 380 in parallel with one another to the base of a transistor 381. In addition, the collector of the transistor 365 is connected through a resistor 382 to the base of a transistor 383. The emitter of the transistor 381 is connected to ground potential and the collector thereof is connected to the connection point between the resistors 370 and 371 and is also connected through a resistor 384 to ground potential. The base of the transistor 381 is connected through a resistor 385 to the source of negative potential and is also connected to the anode of a diode 386. The cathode of the diode 386 is connected through a resistor 387 to ground potential, through a resistor 388 to the source of positive potential, and through a capacitor 389 to the terminal 361. The base of the transistor 383 is connected through a resistor 390 to the source of the negative potential and the emitter thereof is connected to ground potential. The collector of the transistor 383 is connected through a resistor 391 to the source of positive potential and through a resistor 392 to ground potential.

If the flip-flop is in a "set" state, the transistors 365 and 374 will be conductive and the transistors 381 and 383 will be nonconductive. As a result of the conduction of transistor 374, the voltage on the terminal 362 will be essentially at ground potential. The state of the flip-flop 321 is altered by a negative going voltage on one of the terminals 360 or 361. When the voltage on the terminal 360 is reduced, the potential on the base of the transistor 365 will also be reduced causing the transistor 365 to become nonconductive. When the transistor 365 is rendered nonconductive, the voltage on the base of the transistor 383 increases causing that transistor to become conductive. At the same time, the voltage on the base of the transistor 381 increases causing that transistor to become conductive which results in the voltage on the base of the transistor 374 reducing to a level to cause the transistor 374 to be rendered nonconductive. When the transistor 374 is rendered nonconductive, the voltage on the terminal 362 is positive with respect to ground potential. When the transistors 381 and 383 are conductive, the flip-flop circuit is in a "reset" state. In order to change from a "reset" state to a "set" state, a negative going pulse is supplied to the terminal 361 to render the transistor 381 nonconductive. The reaction of the components in the flip-flop 321 is accumulative as described above to cause the transistor 374 to become conductive again.

FIG. 18 illustrates in partial schematic and partial block diagram the divider circuits of 58, the gate circuits 59, the preset register 60, and the register adjust circuit 61 illustrated in FIG. 3. An output of and gate 320 illustrated in FIG. 15 is connected to one input terminal 400 NAND gate for one period. Another input to the NAND gate 401 is supplied on a line 402 which constitutes a "phase advance" signal. An output of the NAND gate 401 is connected to an input of a counter circuit generally designated by reference numeral 403 and formed of a plurality of flip-flops 403$a$—$n$. An output of the flip-flop 403$n$ is connected to an input of a phase advance monostable multivibrator 404 from which the "phase advance" signal is obtained at one output thereof. If each of the flip-flops 403$a$—$n$ is "reset", a pulse will not be supplied at the output of the flip-flop 403$n$ until 2N pulses have been supplied by the NAND gate 401. If, however, all of the flip-flops 403$a$—$m$ are in a "set" state and the flip-flop 403$n$ is in a "reset" state, the next pulse delivered from the NAND gate 401 to the input of the flip-flop 403$a$ will produce an output pulse from the flip-flop 403$n$ which will be supplied to the input of the monostable multivibrator 404 to produce an output pulse therefrom. It can be appreciated, therefore, that the states of the flip-flops 403$a$—$n$ will determine the number of pulses required at an output of the NAND gate 401 before a pulse is supplied at an output of the multivibrator 404. Consequently, the counter circuit 403 performs as a divider of the pulses supplied at an input thereof.

The state of the flip-flops 403$a$—$m$ is controlled by plurality of the NAND gates 405$a$—$m$ and 406$a$—$m$ connected to the "set" and "reset" terminals respectively of the flip-flops 403$a$—$m$. The NAND gates 405 and 406, however, are effective to establish the state of respective ones of the flip-flops 403$a$—$m$ only when a pulse is supplied thereto from an output of the monostable multivibrator 404 on a line 407. That is, an output of the multivibrator 404 on the line 407 is connected in common to all of the NAND gates 405 and 406 and enables those gates only when a pulse is produced at such output.

The second input to the NAND gates 405 and 406 is conditioned by respective outputs of a shift register generally designated with the reference numeral 408. When both inputs to the NAND gates are positive, the output thereof will be at ground potential or at zero volts. When any other condition exists at the inputs of the NAND gates, the output thereof will be positive. In order to change the state of one of the flip-flops 403$a$—$n$, by either "set" or "reset" inputs, respective inputs must be connected to ground potential. For instance, if the flip-flop 403$a$ is in a "set" condition the Q output thereof will be positive with respect to ground potential. In order to change the state of flip-flop 403$a$ to a "reset" state, the terminal $R_D$ must be connected to ground potential which will result in the voltage level on the output terminal Q changing from a positive voltage to zero or ground potential. The NAND gates illustrated in FIGS. 18 and 19 could be considered NOR gates depending upon the convention employed. However, for the purposes of this description, a positive voltage will be considered a zero and ground potential will be considered a one such that the gates illustrated in FIGS. 18 and 19 will be conventionally considered as NAND gates.

By initially establishing a "set" or a "reset" state for respective ones of the flip-flops 403$a$—$m$, a predetermined binary number is set therein which will determine the number of pulses which must be delivered to the C input of the flip-flop 403a before a pulse is delivered at the output Q of the flip-flop 403N. When the voltage on the input C of one of the flip-flops 403a—n is reduced from 5 volts to 0 volts, the state of the respective flip-flop will be altered. This condition for the input of the flip-flop 403a is established only when positive 5 volts is applied to the terminal 400 and is applied on the line 402 as inputs to the NAND gate 401. Since the outputs of the monostable multivibrator 404 Q and Q are complimentary to one another, a positive output on the terminal Q thereof will result in 0 volts being applied to the Q output thereof to disable the NAND gate 401 during the time that the flip-flops 403a—n are being "set" and/or "reset".

As previously mentioned, a divider circuit 408 which is formed of a plurality of serially connected flip-flops similar to those of counter 403 produces one output pulse for every n input pulses and such a divider circuit has a high resolution even at the end of the division capability thereof.

As previously explained, at the low resolution end of the division capability for instance, when a change is made from producing one output pulse for every input pulse to the condition of producing one output pulse for every two input pulses, the output frequency is effectively changed by 100 percent. Since such a change is neither desired nor necessary, one or more of the flip-flops at the output end of the counter 403 are always reset upon the occurrence of an output from the phase advance monostable multivibrator 404.

In FIG. 18, the flip-flop 403n is illustrated as having a positive voltage continuously applied to the "set" input thereof such that this terminal is ineffective to change the state of the flip-flop 403n to a "set" condition. However, the reset input to the flip-flop 403n is connected to an output of the NAND gate 406n which produces an output which is the reverse of the input supplied thereto. Consequently, when an output is produced by the monostable multivibrator 404, the $R_D$ input to the flip-flop 403n will be effectively grounded to "reset" the flip-flop 403n. In one preferred embodiment of the present invention, the counter 403 is formed of 13 flip-flops, with the first 10 flip-flops having the "set" and "reset" inputs thereof connected to NAND gates such that they may be either "set" or "reset" by the shift register 408 and with the last three flip-flops thereof having only their "reset" inputs connected to respective NAND gates 406 such that they may be only "reset" upon the occurrence of "phase advance" output from the multivibrator 404. Such an arrangement permits the application of 8,192 pulses to the input of the counter 403 when all of the flip-flops are reset before an output pulse is produced and a minimum number of 7,169 pulses to the input of the counter 403 before an output pulse is produced if the first 10 flip-flops therein are initially "set." Consequently, a relatively small change results in the frequency of the output pulses produced by the multivibrator 404 from one extreme to the other extreme of the division capability of the counter 403.

The shift register 408 is formed of a plurality of flip-flops 409a—m and a plurality of NAND gates 410a—k and 411a—k. Each of the flip-flops 409 includes an input C, a reset terminal $R_c$, a set terminal $S_c$, and output terminals Q and $\overline{Q}$. The state of flip-flops 409 is determined or established by the voltage level applied to one of the terminals $R_c$ and $S_c$ at the time that a negative-going pulse is supplied to the input C, thereof. That is, if the terminal $R_c$ is grounded and a negative-going pulse is supplied to the input C, the particular flip-flop will be "reset." If, however, the input terminal $S_c$ is grounded and a negative-going pulse is supplied to the input C, the particular flip-flop will be "set." In the "reset" state, the terminal Q will be at zero volts and the terminal $\overline{Q}$ will be at a positive voltage with respect thereto. The "set" state of the flip-flops is opposite to the "reset" state thereof. Each of the Q outputs of the flip-flops 409 are connected to one input of the respective NAND gates 401 and the $\overline{Q}$ output thereof is connected to one input of the respective NAND gate 411. The outputs of the corresponding ones of the NAND gates 410 and 411 are connected in common to the C input of the subsequent flip-flop 409.

The Q outputs of the flip-flops 409 can be considered to form a binary number which is transferred into the counter 403 by means of the NAND gates 405 and 406 upon occurrence of a "phase advance" pulse at the output of the multivibrator 404. This binary number corresponding to the states of the flip-flops 409 can be reduced by enabling the gates 410 and can be increased by enabling the gates 411. In order to enable the gates 410, a second input thereof is connected through a NAND gates 412 to the $\overline{Q}$ output of a flip-flop 413. In order to enable the NAND gate 411, a second input thereof is connected through a NAND gate 414 to the Q output of the flip-flop 413. The NAND gates 412 and 414 perform a negation of a pulse supplied to the input of each.

The $R_c$ inputs of the flip-flops 409a—m are connected to respective outputs of NAND gates 415a—m and the inputs $S_c$ are connected to outputs respective to NAND gates 416a—m. One input of each of the NAND gates 415 and 416 is connected to the $\overline{Q}$ output of a monostable multivibrator 417. The second input of the NAND gates 415 is connected to the Q output of a corresponding flip-flop 409 and the second input of the NAND gate 416 is connected to the $\overline{Q}$ output of a corresponding flip-flop 409. When the monostable multivibrator 417 is in a quiescent state the $\overline{Q}$ output thereof is positive. If one of the flip-flops 409 is in the "reset" state, the $\overline{Q}$ output thereof will be positive which will enable a corresponding one of the NAND gates 416 to place the $S_c$ input thereof at ground potential such that the negative going pulse at the input C thereof will cause the corresponding flip-flop 409 to be "set." If the flip-flop 409 is initially "set," the Q output thereof will be positive enabling the corresponding one of the NAND gates 415 to place the $R_c$ input thereof at ground potential such that a subsequent negative going pulse at the input C thereof will "reset" the flip-flops 409. Consequently, when the multivibrator 417 is in its quiescent state, the state of the shift register 409 can also be altered by the application of pulses to the input C of the flip-flop 409a and by enabling either the NAND gates 410 or the NAND gates 411.

A pair of switches 418 and 419 are provided for establishing different states of the flip-flops 409a—m. The binary number effectively formed by the condition of the flip-flops 409a—m is increased by depressing the switch 418 and connecting ground potential to one input of the NAND gate 420 and is decreased by depressing the switch 419 and connecting ground potential to the other input of the NAND gate 420. It is to be understood that the switches 418 and 419 are spring loaded such that the release thereof will disconnect ground potential from the corresponding input of the NAND gate 420. When neither one of the switches 418 and 419 is depressed, the NAND gate 420 is enabled to provide a zero voltage input to a NAND gate 421. A second input of the NAND gate 421 is connected to a source of clock pulses at terminal 500. If the output of the NAND gate 420 is positive with respect to ground potential, the clock pulses will be passed through the NAND gate 421 to the input C of the flip-flop 409a. Therefore, when either one of the switches 418 or 419 is depressed, the NAND gate 420 will be disabled and the NAND gate 421 will be enabled to provide clock pulses to the input C of the flip-flop 409a.

The switch 418 is also effective to connect zero voltage to the "set" input of a flip-flop 422 and the switch 419 is effective to connect zero voltage to the "reset" input of the flip-flop 422. The C input of the flip-flop 422 is connected to a positive voltage, for example, positive 5 volts. The Q output of the flip-flop 422 is connected to one input of the monostable multivibrator 417 and to the "set" input of the flip-flop 413. The $\overline{Q}$ output of the flip-flop 422 is connected to another input of the multivibrator 417 and to the "reset" input of the flip-flop 413. The C input of the flip-flop 413 is connected to positive voltage, for example, positive 5 volts.

When the operation of the circuit illustrated in the FIG. 18 is initiated, and before either of the switches 418 and 419 is depressed, the flip-flops 413 and 422 will be in a "reset" state. In addition, the NAND gate 420 will be in a "reset" state. In addition, the NAND gate 420 will be enabled causing the NAND gate 421 to be disabled such that clock pulses will not be applied to the C input of the flip-flop 409a. Each of the flip-flops 409a—m will be in a "reset" state. The Q output of the flip-flop 413 will be at 0 volts and will be inverted by the NAND gate 414 such that the NAND gate 411a—k will be enabled. Considering the NAND gate 411a each of the inputs thereto will be at a positive voltage resulting in 0 voltage at the outputs thereof supplied to the input C of a subsequent flip-flop 409. However, because a negative going pulse is required to trigger the flip-flops 409, the flip-flops 409a—m will remain in their "reset" condition. Since the flip-flops and the counter 403 are also initially "reset," a maximum number of pulses must be supplied at the terminal 400 before a pulse is produced on the $\overline{Q}$ output of the multivibrator 404. Consequently, the $\overline{Q}$ output of the multivibrator 404 will reoccur at a minimum rate or minimum frequency. If it is desired to increase the repetition rate of the pulses at the $\overline{Q}$ output of the multivibrator 404, the switch 418 is depressed causing the flip-flop 402 to be "set," the NAND gate 420 disabled, and the NAND gate 421 enabled. As a result, the $\overline{Q}$ output of the flip-flop 422 will produce a negative going pulse on the "reset" input of the flip-flop 413 which will cause the flip-flop 413 to become "reset" if it was previously "set" or to remain "reset" if it had been previously "reset."

As previously mentioned, when the flip-flop 413 is "reset," the Q output thereof is at 0 voltage, which voltage is inverted by the NAND gate 414 to place a positive voltage on one input of each of the NAND gates 411a—k. Initially, the Q outputs of the flip-flops 409a—m will be at 0 volts. If the two outputs of the flip-flops 409a—m are considered to form a binary number, that binary number will initially be zero when all of the flip-flops 409a—m are "reset." With the NAND gates 411a—k enabled, the application of pulses to the input C of the flip-flop 409a will increase that binary number. The greater the binary number formed by the shift register 408, the fewer number of pulses will be required to produce an output from the multivibrator 404. For instance, if the switch 418 is depressed for a time period sufficient to permit only the flip-flop 409a to be "reset," the binary number formed by the shift register 408 will be equal to 1 and, consequently, one less pulse will be required on the terminal 400 to produce an output pulse at an output of the multivibrator 404. For instance, if all of the flip-flops 409a—m are "reset" upon the occurrence of an output pulse from the multivibrator 404, the flip-flops 403a—m will be triggered to their reset condition and a maximum number of pulses will be required on the terminal 400 before another output pulse is delivered from the multivibrator 404. If during the time that the maximum number of pulses are delivered to the terminal 400, the flip-flop 409a is "reset" by the application of an impulse thereto and the "grounding" of the $S_C$ terminal thereof, the subsequent output pulse from the multivibrator 404 and the positive voltage on the Q output of the flip-flop 409a will enable the NAND gate 405a causing the flip-flop 403 A to be "reset." As a result, the next pulse applied to the terminal 400 will reset the flip-flop 403a and set the flip-flop 403b, or in other words, one less pulse will be required on the terminal 400 in order to provide an output from the multivibrator 404. The binary number effectively formed by the Q outputs of the flip-flops 409a—m is reduced by depressing the switch 419. When the switch 419 is depressed, the flip-flop 422 is "reset" causing the flip-flop 413 to be set to enable the NAND gates 410a—k. When the NAND gates 410a—k are enabled and clock pulses are applied to the input of the flip-flop 409a, the binary number formed by the Q outputs of the flip-flops 409a—m will be reduced with each subsequent clock pulse. Because of this positive voltage applied to the inputs C of the flip-flops 422 and 413, such flip-flops will remain in the state dictated by the $R_d$ and $S_d$ inputs thereto. Whenever the state of the flip-flop 422 is changed, the multivibrator 417 disables each of the NAND gates 415 and 416 for a relatively short time period.

In order to eliminate any ambiguities, the states of the flip-flops 403a—n are not altered until a pulse is provided at an output of the multivibrator 404. In order to decrease the possibility of any ambiguity resulting during the time the state of the flip-flops 403a—n is being established, the $\overline{Q}$ output of the monostable multivibrator 404 is employed to provide the clock pulses to one input of the NAND gate 421. As a result of such connection, one and only one pulse will be applied to the input of the shift register 408 while the counter 403 is undergoing one complete cycle of operation. Upon the occurrence of an output from the multivibrator 404, the $\overline{Q}$ output thereof will change from a positive voltage to 0 voltage which will disable the NAND gate 421.

The $\overline{Q}$ output of the multivibrator 404 provides a "phase advance" signal consisting of a plurality of pulses which is employed to drive the multiphase generator illustrated in FIG. 19. As shown therein the "phase advance" is supplied to an input terminal 425 thereof to provide six outputs therefrom which are equally spaced in time with respect to one another. The six outputs from the multiphase generator are developed on terminals 426, 427, 428, 429, 430 and 431. The output on terminal 426 corresponds to the positive portion of the waveform 84 illustrated in FIG. 6 and is connected to the terminal 83a (see FIG. 5) which corresponds to the terminal 280 of the circuit illustrated in FIG. 13. In a like manner, the voltage produced on a terminal 429 corresponds to the negative portion of the waveform 84 illustrated in FIG. 6 and is connected to the terminal 83d of the circuit illustrated in FIG. 5, which terminal also corresponds to the terminal 280 of the circuit illustrated in FIG. 13. The terminals 428 and 431 are connected to the terminals 83b and 83e respectively and the terminals 430 and 427 are connected to the terminals 83c and 83f respectively of the circuit illustrated in FIG. 5. The voltages developed on terminals 428 and 431 correspond to the positive and negative portions respectively of the waveform 84 illustrated in FIG. 6 and the voltage is developed on the terminals 430 and 427 correspond to the positive and negative portions respectively of the wave form 86 illustrated in FIG. 6.

With the application of every six pulses on the terminal 425, an output is produced on each of the terminals 426—431. A counter circuit is formed of flip-flops 432, 433 and 434, which, with the aid of a pair NAND gates 435 and 436 are reset upon the application of every six pulse thereto. The terminal 425 is connected to an input of the flip-flop 432 and to the input of the flip-flop 434. The flip-flops 432—434 are the type which change state upon the application of a negative blank pulse to an input C thereof in accordance with the voltages on the inputs $R_c$ and $S_c$ thereof. If, for example, the terminal $R_c$ is connected to ground potential, a negative blank pulse supplied to the input C thereof will "reset" the particular flip-flop. If, on the other hand, input $S_c$ is grounded a negative blank pulse applied to the input C of the flip-flop will change the state thereof to "set" condition. When the flip-flops 432—434 are "reset," the Q output thereof is at 0 voltage and the $\overline{Q}$ output thereof is at a positive voltage.

The Q output of the flip-flop 432 is connected to the $S_c$ input thereof and the $\overline{Q}$ output is connected to the $R_c$ input thereof such that with each negative going pulse supplied to the input thereof, the flip-flop 432 will change its state. Consequently, each phase advance pulse applied to the input terminal 425 will change the state of the flip-flop 432.

The Q output of the flip-flop 432 is connected to the C input of the flip-flop 433. The Q output of the flip-flop 433 is connected to the $S_c$ input thereof and the $\overline{Q}$ output of the flip-flop 434 is connected to the $R_c$ input thereof. Since the Q output of the flip-flop 433 is initially at 0 voltage, the application of a negative going pulse from a flip-flop 432 to the input C thereof will cause the flip-flop 433 to be "set." This results upon the occurrence of the second impulse applied to the input terminal 425 out of each series of six pulses supplied thereto.

The Q outputs of the flip-flops 432 and 433 and the $\overline{Q}$ output of the flip-flop 434 are connected to respective inputs of the NAND gate 435. The output of the NAND gate 435 is connected to the $S_c$ input of the flip-flop 434. The Q outputs of the flip-flops 432, 433 and 434 are connected to respective inputs of the NAND gates 436. The output of the NAND gate 436 is connected to the $R_c$ input of the flip-flop 434. Since a positive voltage is required on all of the inputs of each of the NAND gates 435 and 436 in order to produce a 0 voltage output therefrom, the flip-flop 434 is not set by the NAND gate 435 until the condition exists in which the Q outputs of the flip-flops 432 and 433 having the $\overline{Q}$ output of 434, are positive. This condition is produced when the third pulse out of a series of six pulses is applied to the input terminal 425. However, since that condition is not existent until after the application of the third pulse, the flip-flop will not be "set" until the application of the fourth pulse out of the series of the six pulses is applied to the input terminal 425. Before the application of the fourth pulse, however, the $R_c$ input of the flip-flop 433 is at positive voltage and the subsequent application of the fourth pulse to the input terminal 425 resulting in the "resetting" of the flip-flop 432 will not change the state of the flip-flop 433. Following the application of the fourth pulse to the input terminal 425, however, the $\overline{Q}$ output of the flip-flop 434 will be at ground potential, and upon the application of the sixth pulse to the input terminal 425, which will again reset the flip-flop 432, the flip-flop 433 will be reset. Upon the application of the fifth impulse out of the series of six pulses applied to the input terminal 425, each of the flip-flops 432, 433 and 434 will be "set" which will enable the NAND gate 436 and place 0 voltage on the $R_c$ input of the flip-flop 434. With the subsequent application of the sixth pulse to the input terminal 425, the flip-flop 434 will "reset."

Considering one complete cycle of the operation of the flip-flops 432, 433 and 434, each of the flip-flops will be initially "reset" and upon the application of a first pulse to the input terminal 425, the flip-flop 432 will be "set" and the flip-flops 433 and 434 will remain "reset." Upon the occurrence of a second pulse to the input terminal 425, the flip-flop 432 will be "reset," the flip-flop 433 will be "set" and the flip-flop 434 will remain "reset." From the application the third pulse to the input terminal 425, the flip-flop 432 will be "set" and the flip-flops 433 and 434 will remain "set" and "reset" respectively. Upon the application of the fourth pulse to the input terminal 425, the flip-flop 432 will be "reset," the flip-flop 433 will remain "set," and the flip-flop 434 will be "set." Upon the application of the fifth pulse to the input terminal 425, the flip-flop 432 will be "set" and the flip-flops 433 and 434 will remain "set." Upon the application of the sixth pulse to the input terminal 425, each of the flip-flops 432, 433 and 434 will be "reset" completing one complete cycle of operation thereof. Each of the flip-flops 432, 433 and 434 can be reset at anytime by the application of a "reset" phase, to a terminal 437 that is connected to the "reset" inputs of each of the flip-flops.

In each complete cycle of operation of the flip-flops 432, 433 and 434, six different output conditions exist which are employed for producing each of the outputs 426—431. The logic circuitry for sensing the six different conditions on the outputs of the flip-flops 432, 433 and 434 includes NAND gates 438, 439, 440, 441, 422 and 443 each having respective inputs connected to respective outputs of the flip-flops 432, 433 and 434. One input of each of the NAND gates 438—443 is connected to the input terminal 425. The remaining three inputs on each of the NAND gates 438—443 are connected to certain ones of the outputs of the flip-flops 432—434, such that each input combination to the NAND gates 438—443 is different.

The $\overline{Q}$ output of the flip-flop 432 is connected through a NAND gate 445 to a pair of contacts 446 and 447 of a switch 448. The Q output of the flip-flop 432 is connected directly to another pair of contacts 449 and 450 of the switch 448. The $\overline{Q}$ output of the flip-flop 443 is connected through a NAND gate 451 to a pair of contacts 452 and 453 of the switch 448. The Q output of the flip-flop 433 is also connected directly to another pair of contacts 454 and 455 of the switch 448. The Q output of the flip-flop 434 is connected through a NAND gate 456 to a pair of contacts 457 and 458 of the switch 448 and is connected directly to another pair of contacts 459 and 460 of the switch 448. The NAND gates 445, 451 and 446 provide an inversion of the voltage supplied to the input thereof. If desired, the NAND gates 445 and 451 and 456 can be eliminated and the respective contacts of the switch 448 which are connected to the outputs of those NAND gates can be connected directly to the Q outputs of the flip-flops 432 and 433 and the $\overline{Q}$ output of the flip-flop 434 respectively. A movable contact 461 of the switch 448 is disposed for connecting one of the contacts 446 and 450 to one input of the NAND gate 438, one input of the NAND gate 440 and one input of the NAND gate 432. Another movable contact 462 of the switch 448 is disposed for connecting one of the contacts 447 and 449 to one input of the NAND gate 439, one input of the NAND gate 441, and one input of the NAND gate 443. Another movable contact 463 of the switch 448 is disposed for connecting one of the contacts 452 and 454 to one input of the NAND gate 438 and one input of the NAND gate 439. Another movable contact 464 of the switch 438 is disposed for connecting one of the contacts 453 and 455 to one input of the NAND gate 432 and one input of the NAND gate 433. An output of the NAND gate 451 is connected directly to one input of the NAND gate 440 and to one input of the NAND gate 441. Another movable contact 465 of the switch 448 is disposed for connecting one of the contacts 457 and 459 to one input of the NAND gate 438 and to one input of the NAND gate 439. Another movable contact 466 of the switch 448 is disposed for connecting one of the contact 458 and 460 to one of the inputs of the NAND gate 442 and one of the inputs 443. An output of the NAND gate 456 is connected directly to one of the inputs of the NAND gate 440, and to one of the inputs of the NAND gate 431. The movable contacts 461—466 are ganged together. In the position of the movable contacts 461—466 as illustrated in FIG. 19, forward rotation of the motor 48 (see FIG. 3) will result, and in the other position of the movable contacts 461—466 reverse rotation of the motor 48 will result.

Since the inputs to the NAND gates 438—443 are formed by a different combination of the six available combinations produced at the outputs of the flip-flops 432, 433 and 434, an output will be produced by each of the NAND gates 438—443 in a predetermined sequence. Upon the occurrence of a pulse at the input terminal 425, each of the NAND gates 438—443 in a predetermined sequence. Upon the occurrence of a pulse at the input terminal 425, each of the NAND gates 438—443 will be blocked. That is, the output of the multivibrator 404 (see FIG. 18) on the $\overline{Q}$ output thereof will be at a positive voltage until a pulse is supplied thereto from the flip-flop 403n at which time the $\overline{Q}$ output will momentarily be reduced to 0 voltage and will again return to a positive voltage. During the occurrence of that negative going pulse, each of the NAND gates 438—443 will be blocked. Upon the reoccurrence of the positive voltage of the $\overline{Q}$ output of multivibrator 404, however, one of the NAND gates 438—443 will be enabled to produce enough output therefrom while the remaining NAND gates will be disabled.

When each of the flip-flops 432—434 are "reset" the NAND gate 438 will be enabled and the NAND gates 439—443 will be disabled. Upon the termination of the first pulse supplied to the input terminal 425 of a series of six pulses, the NAND gate 439 will be enabled and the NAND gates 438 and 440—443 will be disabled. Upon the termination of a subsequent pulse supplied to the input terminal 425, the NAND gate 440 will be enabled and the NAND gates 438, 439, 441, 442 and 443 will be disabled. Upon the termination of the subsequent pulses, the NAND gates 441, 442 and 443 will be enabled in that order, respectively.

The output terminals 426—431 are connected to respective outputs of the NAND gates 470, 471, 472, 473, 474 and 475, respectively. The outputs of each of the NAND gates 438—443 are connected to one input of two of the NAND gates 470—475. Since only one of the NAND gates 438—443 is enabled at a particular time two NAND gates 470—475 will be enabled during the same time. That is, when the NAND gate 438 is enabled, the NAND gates 470 and 475 will be enabled to provide an output on the terminals 426 and 431. When the NAND gate 439 is enabled, the NAND gates 470 and 471 will be enabled to provide an output on the terminals 426 and 427.

Thus, it is seen that the present invention allows continuous control of a plurality of driving motors at different stations with frequency changing channels connected to each motor to determine the speed of each motor.

It will be understood that variations and modifications may be effected without departing from the spirit and scope of the novel concepts of this invention.

We claim as our invention:

1. An electronic drive system for a multisection processing machine capable of maintaining a fixed ratio of speed between various sections of the machine and allowing simultaneous adjustment of the entire machine comprising:
 a plurality of driving means each connected to drive a different section of said machine;
 a source of three-phase alternating power;
 a plurality of rectifier circuits each connected to said source of alternating power whereby to convert the three-phase alternating power to direct current;
 a plurality of direct current circuits each connected to one of said plurality of rectifier circuits so as to filter the output of the rectifier and provide a feedback signal;
 a plurality of inverter commutation circuits respectively connected to the outputs of said direct current circuits for providing a commutation control;
 a plurality of inverter bridges each providing outputs to said plurality of driving means and whereby the outputs vary in amplitude and frequency, said plurality of inverter bridges receiving the outputs of said direct current circuits through said inverter commutation circuits;
 a plurality of polyphase frequency sources for controlling the frequency and amplitude of the inputs to each driving means and supplying outputs to said inverter bridges and said inverter commutation circuits;
 a plurality of direct current regulators each receiving inputs from one of said plurality of polyphase frequency sources and from one of said direct current circuits so as to develop a feedback amplitude control signal; and
 a plurality of rectifier phase control circuits each receiving the output of said one of said DC regulators, and supplying an input to one of said rectifier circuits whereby the amplitude of the rectifier circuits is controlled such that each of said plurality of driving means operates at a speed proportional to the output of the respective polyphase frequency source to which it is connected.

2. An electronic drive system according to claim 1 wherein the plurality of driving means comprise alternating current synchronous motors.

3. An electronic drive system according to claim 2 wherein the alternating current motors are polyphase motors.

4. An electronic drive system according to claim 1 wherein the plurality of inverter commutation circuits produces a polyphase output.

5. An electronic drive system for a multisection processing machine according to claim 1 wherein said plurality of polyphase frequency sources comprise:
 a variable frequency oscillator;
 a plurality of dividers which receive outputs from said variable frequency oscillator to divide the frequency to a predetermined value;
 a plurality of gates connected to said plurality of dividers;
 a plurality of preset registers connected to said plurality of gates;
 a plurality of multiphase generators connected to the outputs of said dividers whereby the outputs thereof comprise desired frequencies; and
 the outputs of said multiphase generators connected to said plurality of inverter bridges.

6. An electronic drive system according to claim 5 wherein the means for controlling the dividing factor of each divider gate comprises, a plurality of preset registers connected to each divider gate.

7. An electronic drive system according to claim 6 comprising register-adjusting means connected to each preset register.

8. An electronic drive system according to claim 1 including a regenerator circuit connected across the input of one of said inverter bridges and supplying an output to said source of alternating power and current regulator and regenerator phase control means connected to the output of said direct current circuit and supplying an input to said regenerator circuit.

9. An electronic drive system according to claim 1 wherein said polyphase frequency source comprises a plurality of frequency converting stages each having an output generator, a divider gate connected to the input of each output generator, means for controlling the dividing factor of the divider gate, and a variable frequency source connected to each of the divider gates.

10. An electronic drive system according to claim 5, wherein one of a plurality of "runup" speed controls is connected between each divider gate and the variable frequency oscillator so as to bring a particular driving means up to its operating speed.

11. An electronic drive system according to claim 1 wherein each of said rectifiers comprises a plurality of input leads and a pair of output leads, the alternating power source connected to the input leads, a first SCR connected between one of the input leads and one of the output leads, a second SCR connected between the one of the input leads and the other output lead and gate control means connected to the first and second SCR's.

12. An electronic drive system according to claim 11 comprising a third SCR connected between a second input lead and the one output lead, and a fourth SCR connected between the second input lead and the second output lead.

13. An electronic drive system according to claim 12 comprising a fifth SCR connected between a third input lead and the one output lead, and a sixth SCR connected between the third input lead and the second output lead.

14. An electronic drive system according to claim 13 wherein the gate control means is connected to the third, fourth, fifth and sixth SCR's.

15. An electronic drive system according to claim 1 wherein each of said inverter bridges have a pair of input lines with one line connected to a source of direct current power and the other connected to an inverter commutation circuit, three output leads between which alternating polyphase voltages occur, first unilateral current means connected between the one input line and to each of the three output leads, second unilateral current means connected between the input of the inverter commutation circuit and to each of the three output leads, a first SCR connected between one of the input leads and one of the output leads, a second SCR connected between one of the input leads and a second of the output leads, a third SCR connected between one of the input leads and the third of the output leads, a fourth SCR connected between the second input lead and one of the output leads, a fifth SCR connected between the second input lead and the second output lead, a sixth SCR connected between the second input lead and the third output lead, and gate control means connected to the first through sixth SCR's.

16. An electronic drive system according to claim 15 wherein one of the polyphase frequency sources is connected to the gate control means.

17. An electronic drive system for a multisection processing machine capable of maintaining a fixed ratio of speed between various sections of the machine and allowing simultaneous adjustment of the entire machine comprising:
 a plurality of driving means each connected to drive a different section of said machine;
 a source of three-phase alternating power;

a plurality of rectifier circuits each connected to said source of alternating power whereby to convert the three-phase alternating power to direct current;

a plurality of inverter bridges each providing outputs to said plurality of driving means and whereby the outputs vary in amplitude with frequency;

a plurality of polyphase frequency sources for controlling the frequency and amplitude of the inputs to each driving means;

a plurality of direct current regulators and phase control circuits each connected to one of said polyphase frequency sources and supplying an input to one of said rectifier circuits whereby the amplitude of said rectifier circuit varies as a function of the frequency of said one of said polyphase sources;

the outputs of each of said rectifier circuits connected to one of said plurality of inverter bridges to produce an output with a frequency and amplitude suitable for driving one of said plurality of driving means; and a plurality of regenerator circuits connected to the outputs of one of said plurality of direct current circuits and with their outputs connected to the source of three-phase alternating power to supply regenerative power to the system when a particular driving means is producing regenerative power.

18. An electronic drive system according to claim 17 wherein said regenerator circuit converts direct current power to polyphase power and comprises a pair of input lines and three output lines; a first SCR connected between one input line and a first output line; a second SCR connected between one input line and a second output line, a third SCR connected between one input line and a third output line, a fourth SCR connected between the second input line and one output line, a fifth SCR connected between the second input line and a second output line, a sixth SCR connected between the second input line and the third output line, and gate control means connected to the first through sixth SCR's to convert the direct current power to polyphase power.

19. An electronic drive system according to claim 18 comprising phase control means connected to the gate control means.

20. An electronic drive system according to claim 1 wherein each of said plurality of inverter commutation circuits has a first input lead and a first output lead, an unilateral current device, and an electronic gate device connected in series between the first input and first output leads, a gate control connected to the electronic gate device, and a second opposite poled unilateral current device connected in parallel between the first input and output leads.

21. An electronic drive system according to claim 1 wherein each of said rectifier phase control circuits comprises: an electronic device; variable biasing means for the electronic device; and a control circuit connected in circuit with the variable biasing means and the electronic device to control the phase of the output signal of the electronic device.

22. An electronic drive system according to claim 11 wherein said gate control means comprises a pair of output terminals, an electronic gate device connected across the output terminals, a biasing circuit connected to the gate electrode of the electronic gate device, an input terminal, an alternating input signal supplied to the input terminal, means for converting the input signal to a plurality of pulses of the same polarity, a capacitor to which the plurality of pulses is applied, a multivibrator connected between the biasing circuit and the capacitor, and sensing means in circuit with the multivibrator to couple the signal on the capacitor to the multivibrator.

23. An electronic drive system according to claim 9 wherein said frequency converting stages comprise pulse chopping means which eliminate certain input pulses from the output.

24. An electronic drive system according to claim 23 wherein said pulse chopping means comprise: a fixed frequency oscillator; a counter connected to the output of the fixed frequency oscillator; an AND gate connected to the output of the fixed frequency oscillator; preset gates connected to the counter; a binary stage connected to the counter and the preset gates; and the binary stage connected to said AND gate.

25. An electronic drive system according to claim 10 wherein said "runup" speed control comprises: an AND gate connected to the variable frequency source; a flip-flop circuit with its output connected to the AND gate; and a multivibrator connected to said flip-flop circuit.

26. An electronic drive system according to claim 1 including a plurality of current regulators each connected to one of said plurality of direct current circuits, a plurality of regenerator phase control circuits connected to each of said current regulators and supplying an input to one of said regenerator circuits, whereby power produced by said driving means when in a regenerative condition is fed back to said source of three-phase alternating power.

UNITED STATES PATENT OFFICE
CERTIFICATE OF CORRECTION

Patent No. 3,600,655          Dated August 17, 1971

Inventor(s) KARLIN, JUSTUS, and BUSKER

It is certified that error appears in the above-identified patent and that said Letters Patent are hereby corrected as shown below:

Column 2, line 16, Change "vary" to --very--.

Column 3, line 65, change "probable" to --probably--.

Column 5, line 53, after "for" insert --a--.

Column 5, line 57, change "A" to --a--.

Column 8, line 68, after "38" insert --and--.

Column 11, line 22, delete --s--.

Column 12, lines 31-32, after "78" insert --is connected in parallel with the diode 76 and a resistor 79--.

Column 12, line 64, change "tow" to --two--.

Column 13, line 42, after "also" insert --to--.

Column 14, line 73, change "positions" to --portions--.

Column 16, line 59, after "or" insert --a--.

Column 18, line 42, change "The collector addition" to --In addition--.

Column 18, line 47, after the first use of the word "terminal" insert --198--.

Column 21, line 18, change "216 to 217" to --216 and 217--.

UNITED STATES PATENT OFFICE
CERTIFICATE OF CORRECTION

Patent No. 3,600,655            Dated August 17, 1971

Inventor(s) KARLIN, JUSTUS, and BUSKER

- 2 -

It is certified that error appears in the above-identified patent and that said Letters Patent are hereby corrected as shown below:

(continued)

Column 21, line 64, after "thereof" insert --of--.

Column 21, line 72, change "114" to --214--.

Column 22, line 44, change "position" to --positive--.

Column 23, line 28, delete the second --the--.

Column 24, line 44, make "charge" into --charges--.

Column 24, line 58, delete --This--.

Column 25, line 3, change "SCr" to --SCR--.

Column 25, line 26, change "of" to --from--.

Column 25, line 65, change "from" to --form--.

Column 26, line 12, delete the --.-- after "transistor".

Column 26, line 21, change "The signal conductive" to --rendered conductive--.

Column 27, line 12, change "47" to --57--.

Column 27, line 19, change "and counter" to --the counter--.

Column 27, line 44, change "slot" to --slow--.

UNITED STATES PATENT OFFICE
CERTIFICATE OF CORRECTION

Patent No. 3,600,655  Dated August 17, 1971

- 3 -

Inventor(s) KARLIN, JUSTUS, and BUSKER

It is certified that error appears in the above-identified patent and that said Letters Patent are hereby corrected as shown below:

(continued)

Column 28, line 29, change "nd" to --and--.

Column 28, line 46, make "there of" to --thereof--.

Column 29, line 32, after "368" insert --to the source of positive potential. The resistors 367 and 368--.

Column 29, line 34, after "connected" insert --through a resistor 369 to a source of negative potential and through--.

Column 29, line 39, change "375." to --374--.

Column 29, line 39, after "374" insert --The base of the transistor 374 is connected through a resistor 375--.

Column 29, line 41, after "resistor" insert --376 to a source of positive potential and through a resistor--.

Column 30, line 7, after "transistors" insert --365 and 374 are nonconductive and the transistors--.

Column 31, line 9, the second "Q" should be --$\overline{Q}$--.

Column 31, line 11, the second "Q" should be --$\overline{Q}$--.

Column 31, line 71, change "401" to --410--.

Column 32, line 3, insert --the-- after "upon".

UNITED STATES PATENT OFFICE
CERTIFICATE OF CORRECTION

Patent No. 3,600,655          Dated August 17, 1971

Inventor(s) KARLIN, JUSTUS, and BUSKER      - 4 -

It is certified that error appears in the above-identified patent and that said Letters Patent are hereby corrected as shown below:

(continued)

Column 32, line 36, change "409" to --408--.

Column 36, lines 46-47, should be deleted.

Column 36, line 54, insert --the-- before "multivibrator".

Signed and sealed this 10th day of April 1973.

(SEAL)
Attest:

EDWARD M. FLETCHER, JR.　　　　　　　ROBERT GOTTSCHALK
Attesting Officer　　　　　　　　　　Commissioner of Patents